(12) United States Patent
Uetani

(10) Patent No.: US 6,732,131 B1
(45) Date of Patent: May 4, 2004

(54) DISCRETE COSINE TRANSFORMATION APPARATUS, INVERSE DISCRETE COSINE TRANSFORMATION APPARATUS, AND ORTHOGONAL TRANSFORMATION APPARATUS

(75) Inventor: Yoshiharu Uetani, Kawasaki (JP)

(73) Assignee: Kabushikikaisha Toshiba, Kawasaki (JP)

( * ) Notice: Subject to any disclaimer, the term of this patent is extended or adjusted under 35 U.S.C. 154(b) by 591 days.

(21) Appl. No.: 09/664,573

(22) Filed: Sep. 18, 2000

(30) Foreign Application Priority Data

Sep. 30, 1999 (JP) .......................... 11-280673

(51) Int. Cl.[7] ............................................. G06F 17/14
(52) U.S. Cl. ..................................... 708/402; 708/400
(58) Field of Search ............................... 708/400–402; 375/240.2

(56) References Cited

U.S. PATENT DOCUMENTS 4,849,922 A * 7/1989 Riolfo ........................ 708/402
5,249,146 A * 9/1993 Uramoto et al. ............ 708/402
5,583,803 A * 12/1996 Matsumoto et al. ........ 708/401
5,590,066 A * 12/1996 Ohki .......................... 708/401
5,610,849 A * 3/1997 Huang ........................ 708/401
5,737,256 A * 4/1998 Nakagawa et al. ......... 708/400
5,805,482 A * 9/1998 Phillips ...................... 708/402
6,282,555 B1 * 8/2001 Ohara ........................ 708/401
6,295,320 B1 * 9/2001 Lim et al. ................. 375/240.2
6,327,602 B1 * 12/2001 Kim ........................... 708/401

FOREIGN PATENT DOCUMENTS

JP 9-322168 12/1997

* cited by examiner

*Primary Examiner*—Chuong Dinh Ngo
*Assistant Examiner*—Chat C Do
(74) *Attorney, Agent, or Firm*—Oblon, Spivak, McClelland, Maier & Neustadt, P.C.

(57) ABSTRACT

A discrete cosine transformation apparatus comprises a transposition section that transposes input picture signal of N×N pixels in every N pixels between the one-dimensional processing and the two-dimensional processing and a transformation section that subjects an output of the transposition section to a discrete cosine transformation.

2 Claims, 27 Drawing Sheets

DISCRETE COSINE TRANSFORMATION APPARATUS, INVERSE DISCRETE COSINE TRANSFORMATION APPARATUS, AND ORTHOGONAL TRANSFORMATION APPARATUS

CROSS-REFERENCE TO RELATED APPLICATIONS

This application is based upon and claims the benefit of priority from the prior Japanese Patent Application No. 11-280673, filed on Sep. 30, 1999, the entire contents of which are incorporated herein by reference.

BACKGROUND OF THE INVENTION

The present invention relates to a discrete cosine transformation (DCT) apparatus and an inverse discrete cosine transformation (IDCT) apparatus which are often employed for compression and decompression of picture data and particularly to a discrete cosine transformation apparatus and an inverse discrete cosine transformation apparatus for allowing a two-dimensional transformation to be carried out in a one-dimensional transformation circuit.

The discrete cosine transformation is generally used for video compression such as in a digital television broadcast system. Conventionally, the application of higher operating clock frequencies was not easy. As the operating clock in LSIs has successfully been shifted to higher frequencies, two-dimensional transformation is now feasible with the use of a single one-dimensional DCT or IDCT circuit operated two times for video compression/decompression of e.g. a high-definition TV system. Such a scheme of the circuit arrangement contributes to the scale down of the entire circuit size of an LSI, hence permitting the price to be reduced.

However, when one-dimensional processing is shifted to two-dimensional processing over every input of less than eight-point data, such as one-point (one pixel or one coefficient) unit or a two-point unit, it is necessary to provide in the one-dimensional transformation circuit a register for saving the results of intermediate operation between the one-dimensional processing and the two-dimensional processing. The register has a significant size substantially equal to the scale of a two-dimensional transformation circuit, hence failing to minimize the overall circuit size.

FIG. 18 illustrates a related technique of switching each block of data between the one-dimensional processing and the two-dimensional processing with the use of an eight-point transformation processor which receives the data at a rate of two units of data per clock period and outputs two eight-point transformed data for every one clock period. As the delay of output due to the arithmetic operation extends throughout substantially seven clock periods, the transposed output is enabled only after the four clock periods from the completion of input of one-dimensional transformed data. More specifically, the transformation of one block yields an invalid operation of four clock periods. Also, as the write (output of one-dimensional transformed data) and the read (input of one-dimensional transformed data for two-dimensional transformation) are executed simultaneously in substantially four clock periods for every 68 clocks, the transposition memory has to be implemented by two-port RAM (random access memory) and its area size will hardly be reduced. Furthermore, the input and output are discontinuous from one block to another. For smoothing the operation at one data per clock period, the input and the output of the data require a memory size of 32 coefficients, respectively.

FIG. 19 illustrates another related technique of switching each block between the one-dimensional processing and the two-dimensional processing with the use of a one-port RAM as the transposition memory, hence reducing the RAM area to a half. For preventing the read and the write from occurring on the transposition memory, the start of the read is further delayed by four clock periods from that shown in FIG. 18. This will extend the invalid operation per block to eight clock periods, thus declining the operational efficiency. Similar to the operation shown in FIG. 18, the input and the output are discontinuous from one block to another. For smoothing the input and output data to one data per clock period, the memory size of 32 coefficients may be required for the input and output operation, respectively.

FIG. 20 illustrates a further another related technique of switching in every two blocks between the one-dimensional processing and the two-dimensional processing in order to eliminate the invalid operation period generated in processing every block. However, the transposition memory requires a memory capacity of two blocks since the one-dimensional processing and the two-dimensional processing are switched in every two blocks. Also, as the read and the write are executed once, like the related technique shown in FIG. 18, the transposition memory may be implemented by a two-port type RAM hence increasing the memory area size to four times greater than that shown in FIG. 19.

In that case, the input and output of data are discontinuous on the basis of two blocks. For smoothing the input and output data to one data per clock period, the memory size of 64 coefficients may be needed for the input and output, respectively.

While switching between the one-dimensional processing and the two-dimensional processing is conducted in every one block or every two blocks, the read and the write are executed at one time. As a result, the transposition RAM area will hardly be decreased or the operational efficiency will be declined. Also, for preventing the input and output of data from being discontinuous constantly, a significant size of the data memory is required. More specifically, while the one-dimensional transformation circuit remains not increased in the size, the transposition memory may increase in the size or its operational efficiency may be declined.

BRIEF SUMMARY OF THE INVENTION

It is an object of the present invention to provide a orthogonal transformation apparatus, such as a discrete cosine transformation apparatus or an inverse discrete cosine transformation apparatus, in which declination of the operational efficiency can be minimized even when data blocks cannot be input at predetermined intervals and two-dimensional orthogonal transformation can be performed with the use of a small circuit arrangement.

According to the present invention, there is provided a discrete cosine transformation apparatus comprising a transposition section which transposes input picture signal of N×N pixels between one-dimensional processing and two-dimensional processing, and a transformation section which subjects an output of the transposition section to a discrete cosine transformation.

According to the present invention, there is provided an inverse discrete cosine transformation apparatus comprising a transposition section which transposes input DCT coefficients of N×N in every N coefficients between one-dimensional processing and two-dimensional processing, and a transformation section which subjects an output of the transposition section to an inverse discrete cosine transformation.

According to the present invention, there is provided a discrete cosine transformation/inverse discrete cosine transformation apparatus comprising a single N-point transformation processor which switches in every N points between the one-dimensional processing and the two-dimensional processing to perform orthogonal transformation of N×N points.

According to the present invention, there is provided a discrete cosine transformation apparatus comprising an input processor which outputs data input one by one, at a rate of 2M data per clock period for M clock periods, an N-point transformation section which N-point transforms data input at the rate of 2M data per clock period from the input processor and outputs the transformed data at the rate of 2M data per clock period, an output processor which continuously outputs the one-dimensionally transformed data input at the rate of 2M data per clock period from the N-point transformation processor at the rate of 2M data per clock period for every N/2M clock periods while rounding N two-dimensionally transformed data input at the rate of 2M data per clock period in the succeeding N/2M clock periods, and a transposition processor which transposes N×N data input continuously at the rate of 2M data per clock period in every M clock periods and reading them continuously at the rate of 2M data per clock period in every M clock periods.

According to the present invention, the single eight-point transformation processor switches the one-dimensional processing and the two-dimensional processing alternately in every eight points to perform a discrete cosine transformation or an inverse discrete cosine transformation of 8×8 data, hence preventing its overall size from increasing and particularly reducing the circuit arrangement of its transposition RAM to a half.

Additional objects and advantages of the present invention will be set forth in the description which follows, and in part will be obvious from the description, or may be learned by practice of the invention. The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention, and together with the general description given above and the detailed description of the preferred embodiments given below, serve to explain the principles of the invention.

DETAILED DESCRIPTION OF THE INVENTION

Figure 1:
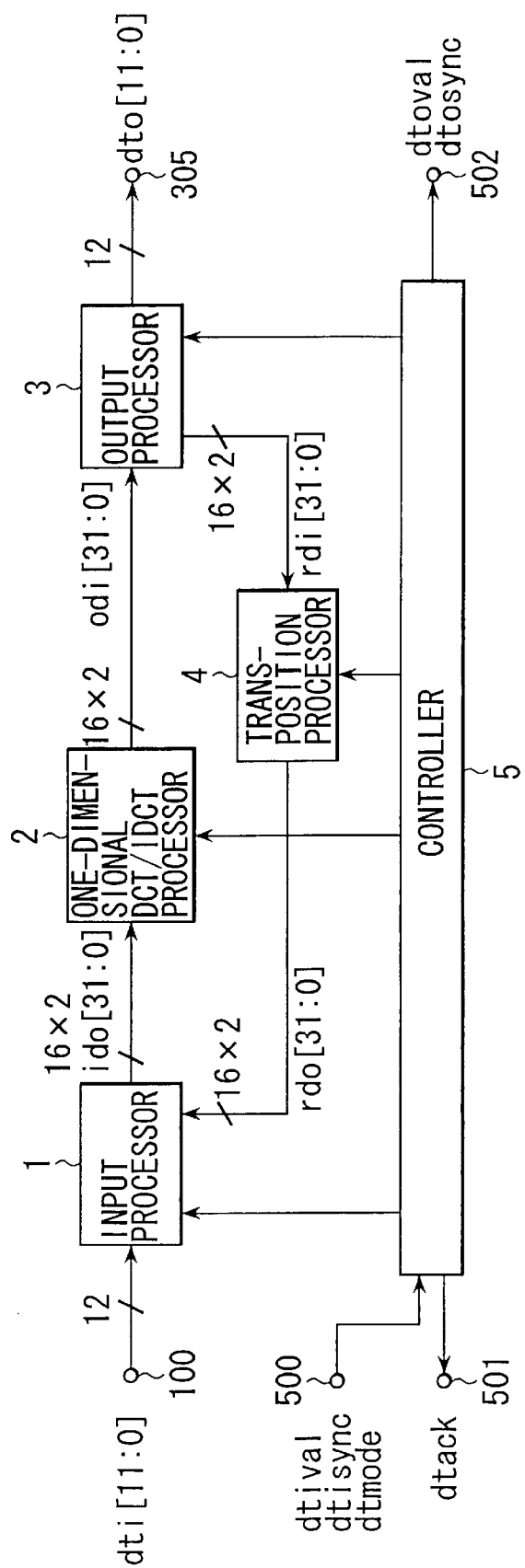
FIG. 1 is a block diagram showing a circuit arrangement of one embodiment of the present invention.
Figure 2:
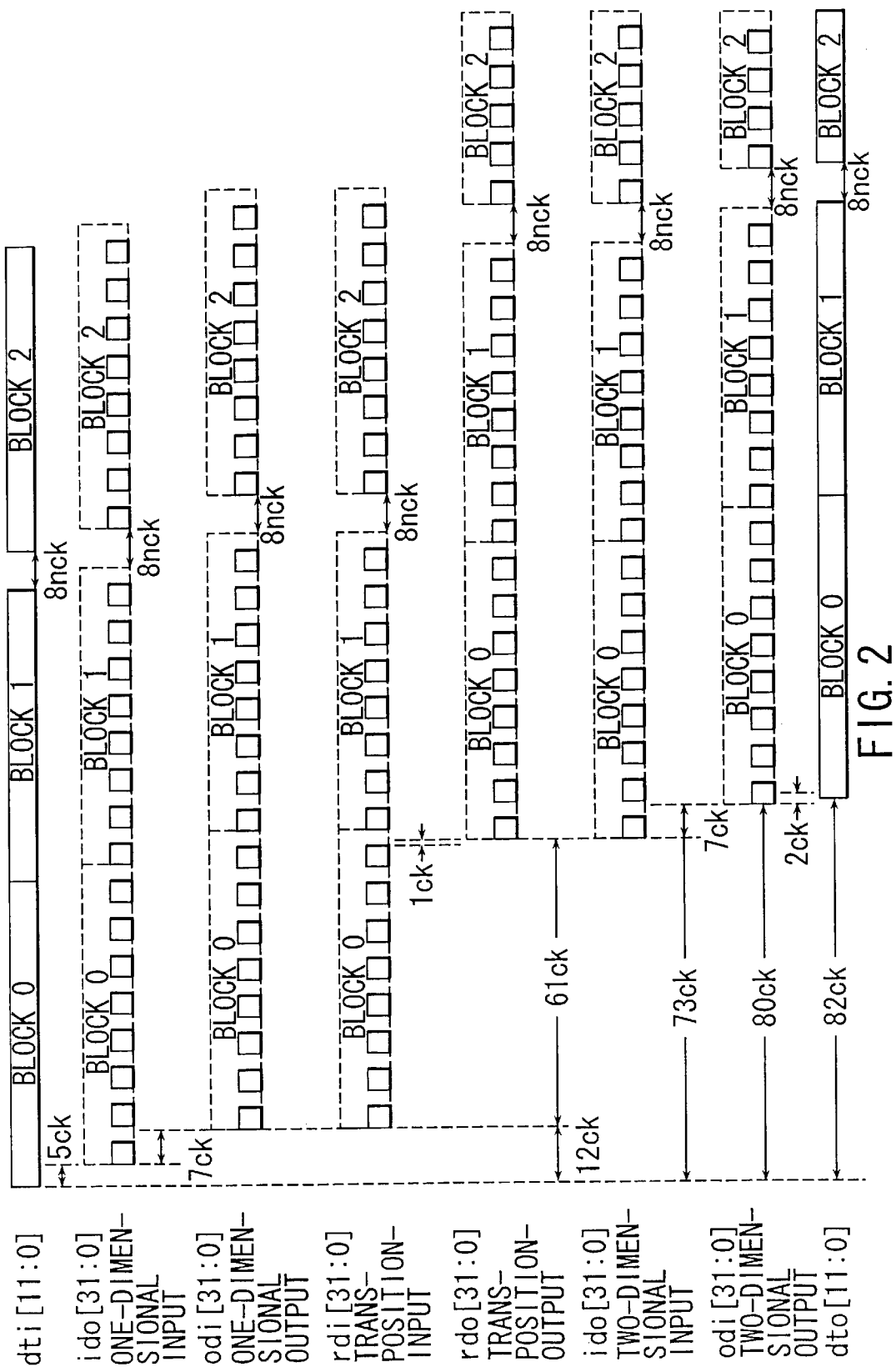
FIG. 2 is a diagram schematically showing control operation in the embodiment.

FIG. 1 is a block diagram of a two-dimensional orthogonal transformation apparatus for carrying out both a DCT processing of 8×8 and an IDCT processing of 8×8 points in a single eight-point transformation processor, showing one embodiment of the present invention. FIG. 2 schematically illustrates an operation of the apparatus.

TABLE 1

| V\H | x0 | x1 | x2 | x3 | x4 | x5 | x6 | x7 |
|-----|----|----|----|----|----|----|----|-----|
| y0 | 0 | 1 | 2 | 3 | 4 | 5 | 6 | 7 |
| y1 | 8 | 9 | 10 | 11 | 12 | 13 | 14 | 15 |
| y2 | 16 | 17 | 18 | 19 | 20 | 21 | 22 | 23 |
| y3 | 24 | 25 | 26 | 27 | 28 | 29 | 30 | 31 |
| y4 | 32 | 33 | 34 | 35 | 36 | 37 | 19 | 19 |
| y5 | 40 | 41 | 42 | 43 | 44 | 45 | 46 | 47 |
| y6 | 48 | 49 | 50 | 51 | 52 | 53 | 54 | 55 |
| y7 | 56 | 57 | 58 | 59 | 60 | 61 | 62 | 63 |

TABLE 2

| V\H | f0 | f1 | f2 | f3 | f4 | f5 | f6 | f7 |
|-----|----|----|----|----|----|----|----|-----|
| g0 | 0 | 8 | 16 | 24 | 32 | 40 | 48 | 56 |
| g1 | 1 | 9 | 17 | 25 | 33 | 41 | 49 | 57 |
| g2 | 2 | 10 | 18 | 26 | 34 | 42 | 50 | 58 |

TABLE 2-continued

| V\H | f0 | f1 | f2 | f3 | f4 | f5 | f6 | f7 |
|---|---|---|---|---|---|---|---|---|
| g3 | 3 | 11 | 19 | 27 | 35 | 43 | 51 | 59 |
| g4 | 4 | 12 | 20 | 28 | 36 | 44 | 52 | 60 |
| g5 | 5 | 13 | 21 | 29 | 37 | 45 | 53 | 61 |
| g6 | 6 | 14 | 22 | 30 | 38 | 46 | 54 | 62 |
| g7 | 7 | 15 | 23 | 31 | 39 | 47 | 55 | 63 |

Table 1 illustrates an input sequence of an 8×8 pixel array which is input into the apparatus for DCT processing, where {x0, x1, ..., x6, x7} represent horizontal pixel positions and {y0, y1, ..., y6, y7} represent vertical pixel positions. Table 2 illustrates an output sequence of DCT transformed data (an 8×8 array of DCT coefficients) output from the apparatus, where {f0, f1, ..., f6, f7} represent horizontal frequency components and {g0, g1, ..., g6, g7} represent vertical frequency components. f0 and g0 are a horizontal DC component and a vertical DC component respectively. f7 and g7 are the largest horizontal frequency component and the largest vertical frequency component of the eight-point DCT respectively. Table 3 illustrates an input sequence of an 8×8 array of DCT coefficients which are input into the apparatus for the IDCT processing. Table 4 illustrates an output sequence of IDCT transformed data (an 8×8 array of pixels) output from the apparatus.

TABLE 3

| V\H | f0 | f1 | f2 | f3 | f4 | F5 | f6 | F7 |
|---|---|---|---|---|---|---|---|---|
| g0 | 0 | 8 | 16 | 24 | 32 | 40 | 48 | 56 |
| g1 | 1 | 9 | 17 | 25 | 33 | 41 | 49 | 57 |
| g2 | 2 | 10 | 18 | 26 | 34 | 42 | 50 | 58 |
| g3 | 3 | 11 | 19 | 27 | 35 | 43 | 51 | 59 |
| g4 | 4 | 12 | 20 | 28 | 36 | 44 | 52 | 60 |
| g5 | 5 | 13 | 21 | 29 | 37 | 45 | 53 | 61 |
| g6 | 6 | 14 | 22 | 30 | 38 | 46 | 54 | 62 |
| g7 | 7 | 15 | 23 | 31 | 39 | 47 | 55 | 63 |

TABLE 4

| V\H | x0 | x1 | x2 | x3 | x4 | x5 | x6 | x7 |
|---|---|---|---|---|---|---|---|---|
| y0 | 0 | 1 | 2 | 3 | 4 | 5 | 6 | 7 |
| y1 | 8 | 9 | 10 | 11 | 12 | 13 | 14 | 15 |
| y2 | 16 | 17 | 18 | 19 | 20 | 21 | 22 | 23 |
| y3 | 24 | 25 | 26 | 27 | 28 | 29 | 30 | 31 |
| y4 | 32 | 33 | 34 | 35 | 36 | 37 | 38 | 39 |
| y5 | 40 | 41 | 42 | 43 | 44 | 45 | 46 | 47 |
| y6 | 48 | 49 | 50 | 51 | 52 | 53 | 54 | 55 |
| y7 | 56 | 57 | 58 | 59 | 60 | 61 | 62 | 63 |

An array of pixels to be subjected to DCT are input in the sequence shown in Table 1 at a rate of one data per clock period into an input terminal 100 of the two-dimensional orthogonal transformation apparatus. For the IDCT processing, DCT coefficients are introduced in the sequence shown in Table 3 at a rate of one data per clock period to the input terminal 100. An input processor 1 outputs data dti[11:0] input from the input terminal 100 by two units of data (ido[31:0]) in every clock period, as shown in FIG. 2. The input processor 1 outputs the unit data for four clock periods and then, for the succeeding four clock periods, selectively outputs data (ido[31:0]) output as two units of data (rdo[31:0]) in every clock period from a transposition processor 4.

When a one-dimensional DCT/IDCT processor 2, i.e., an eight-point transformation processor in this embodiment receives the two units of data in every one clock period, it outputs eight-point transformed data at a rate of two units of data per clock period. As shown in FIG. 2, a difference between the input and the output of input and output delays (ido and odi) is set as seven clocks.

An output processor 3 outputs one-dimensional transformed data (odi[31:0]), which have been input at the rate of two units of data per clock period from the eight-point transformation processor 2, as rdi[31:0] at a rate of two units of data per clock period to the transposition processor 4 for four clock periods. Also, the output processor 4 rounds eight two-dimensional transformed data input as two units of data from the eight-point transformation processor 2 and outputs them as dto[11:0] at a rate of one data per clock period from an output terminal 305 for the succeeding four clock periods, the total output being extended for eight clock periods.

The transposition processor 4 transposes 64 units of data written by two units of data (rdi[31:0]) per clock period for four clock periods and outputs transposed data by two units of data per clock period for four clock periods. As shown in FIG. 2, the data read out from the transposition memory is delayed by one clock period with respect to a readout control signal, hence allowing the write of rdi[31:0] and the read action of rdo[31:0] not to be executed at one time.

A control processor 5 controls the action of the input processor 1, the eight-point orthogonal transformation processor 2, the output processor 3, and the transposition processor 4 and generates an input/output interface control signal for the two-dimensional orthogonal transformation apparatus. The input/output interface control signal includes a signal dtack (an output terminal 501) and a signal dtosync (an output terminal 502) indicative of the head of output block data. The signal dtack is a signal for not limiting the timing of starting the fetch of data input to the input terminal 100 when all the one-dimension transformed data are completely input to the eight-point orthogonal transformation processor 2 but limiting in every eight clock periods the timing of starting the fetch of data input to the input terminal 100 when all the one-dimensional transformed data are not completely input to the eight-point orthogonal transformation processor 2.

In this embodiment, as the write and the read of the transposition memory in the transposition processor 4 are not executed at the same time, a one-port RAM of 64 data storage capacity can be employed as the transposition memory hence reducing the overall memory circuit size to a half. Also, the eight-point orthogonal transformation processor 2 generates no invalid operation periods when the block data can be continuously input. If the block data can not be continuously input and there is a space of less than 64 clock periods between two units of block data, the timing of starting the input may be limited by eight clock periods. This generates an invalid operation duration of less than eight clock periods. However, the compression and decompression of picture data is commonly performed over a unit of six blocks and no actual drawback in the operation will be expected.

More details of the components are now explained.

Figure 3:
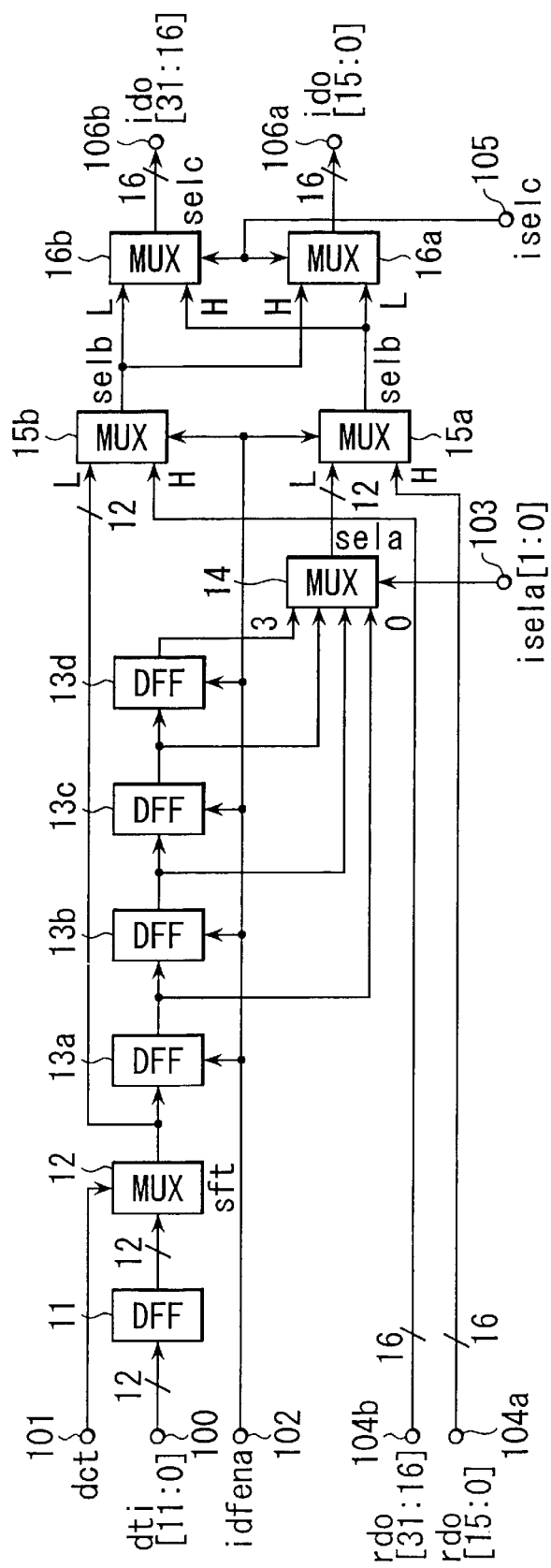
FIG. 3 is a block diagram showing a circuit arrangement of an input processor 1 in the embodiment.
Figure 4A:
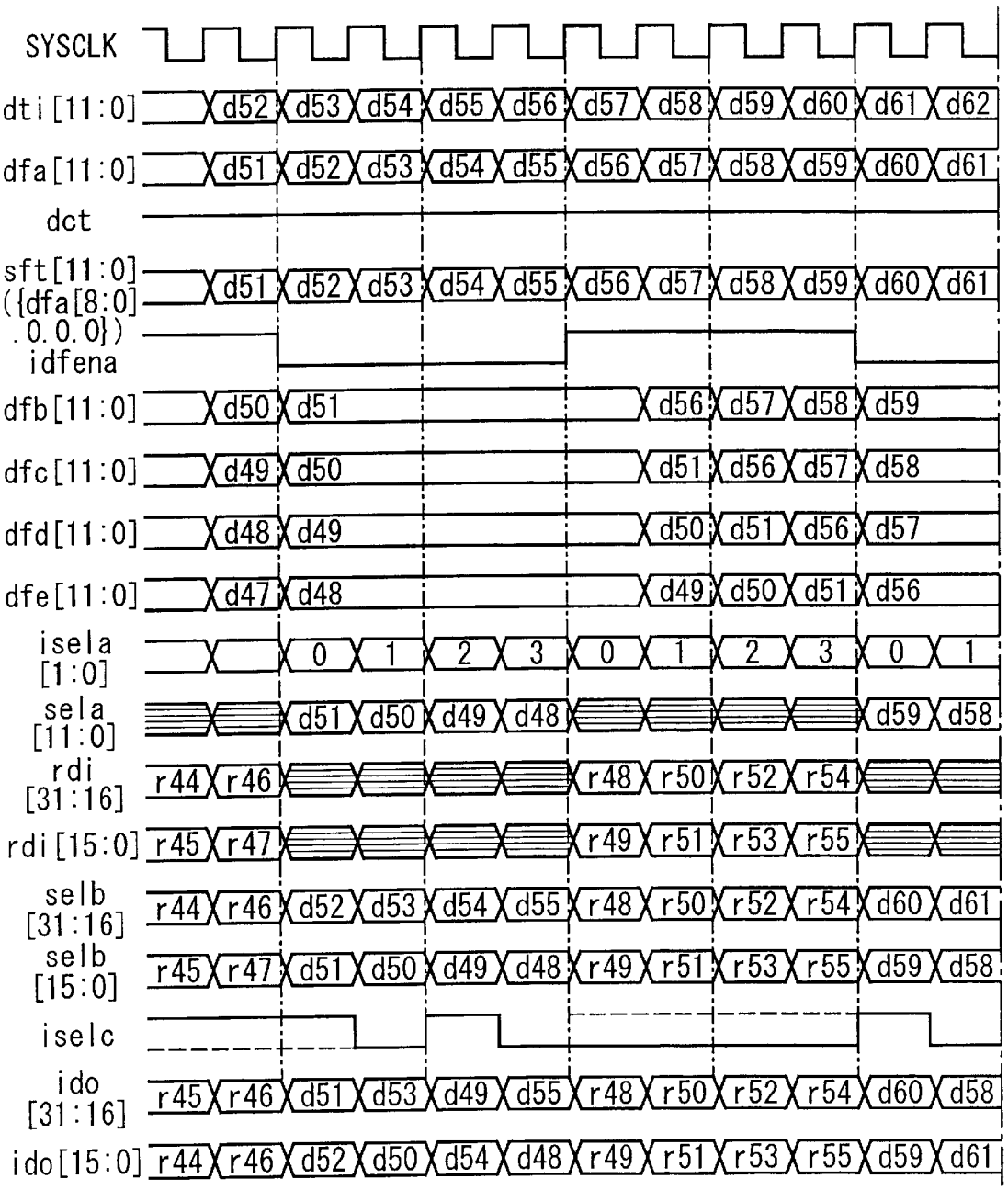
FIGS. 4A and 4B are diagrams schematically showing a DCT processing operation of the input processor 1 in the embodiment.
Figure 4B:
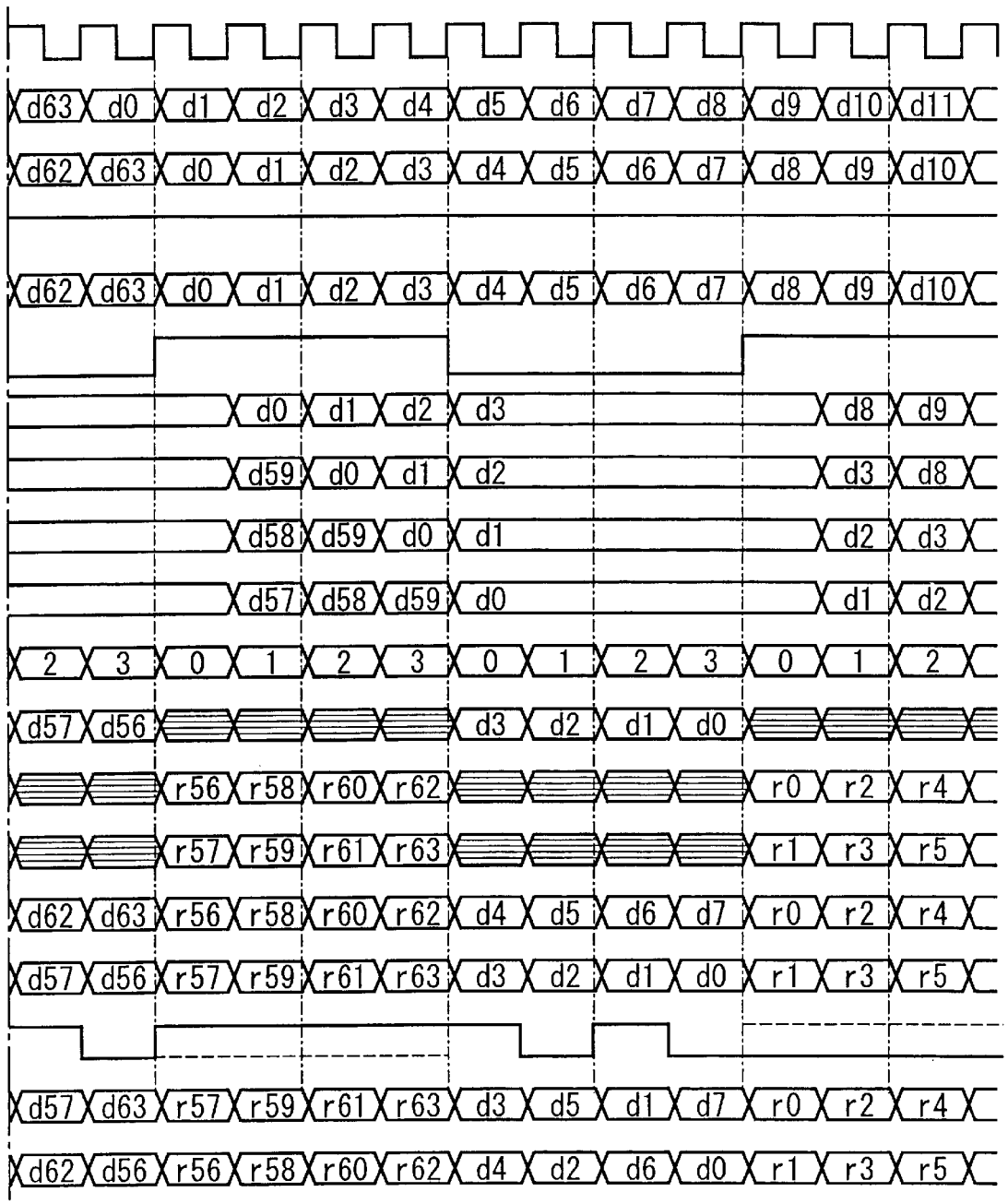
Figure 5A:
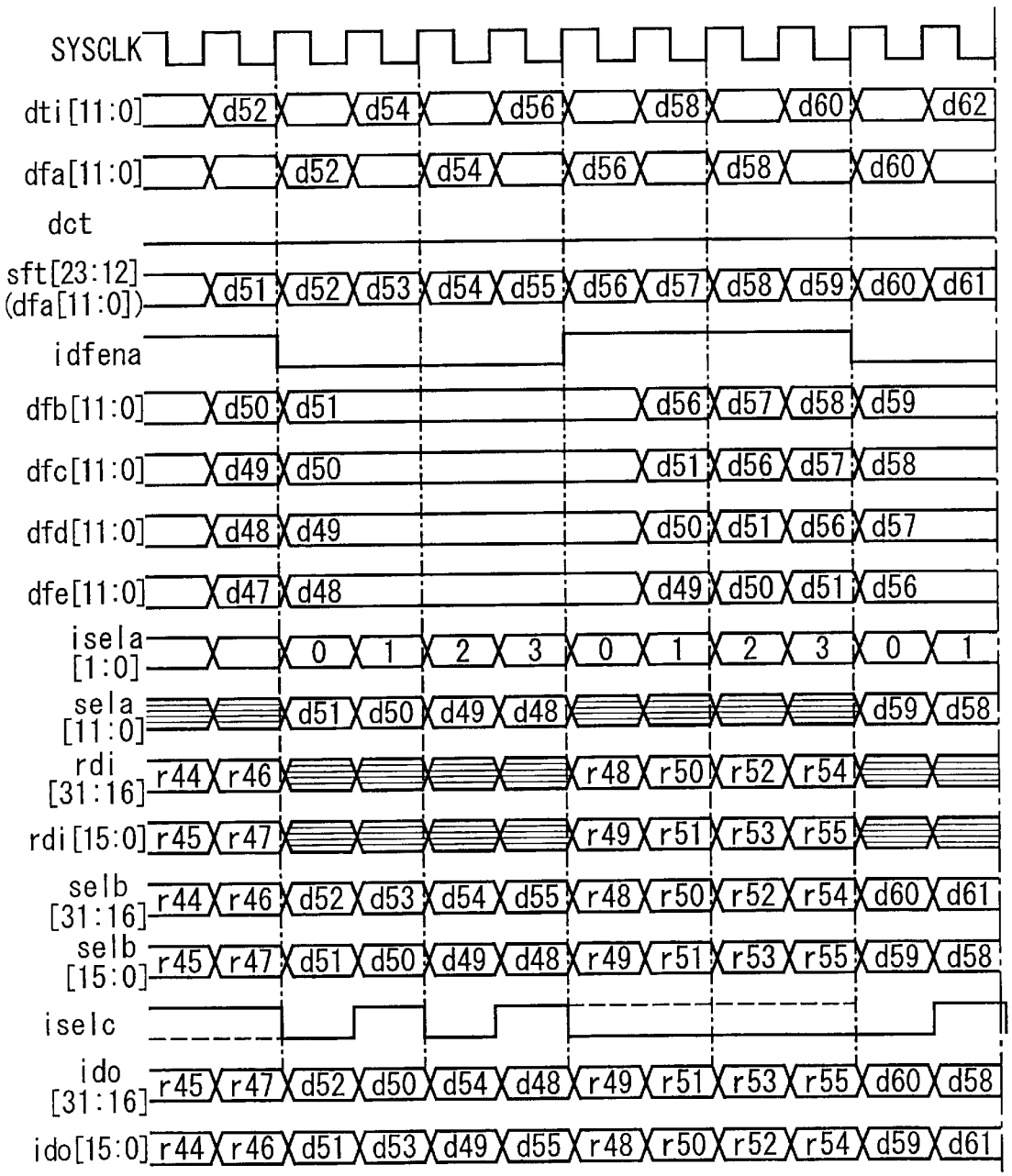
FIGS. 5A and 5B are diagrams schematically showing an IDCT processing operation of the input processor 1 in the embodiment.
Figure 5B:
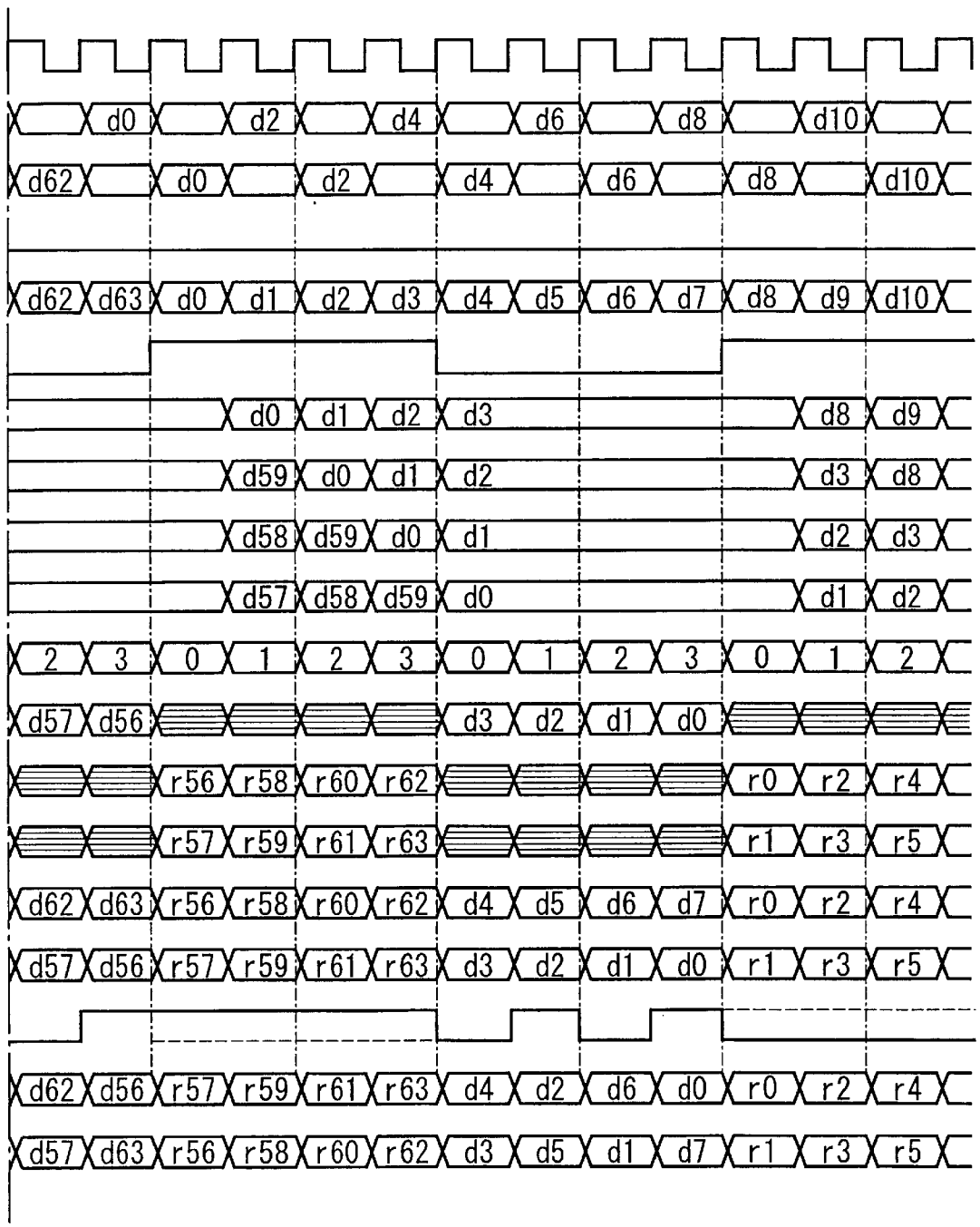

FIG. 3 is a block diagram showing an arrangement example of the input processor 1. FIGS. 4A and 4B are diagrams showing the timing of DCT processing in the input processor 1. FIGS. 5A and 5SB are diagrams showing the timing of IDCT processing in the input processor 1. As shown in FIG. 3, an input register 11 (dfa) fetches data dti[11:0] from the input terminal 100 in every clock period. A shifter 12 (sft) is a selector arranged responsive to a control signal (dct) input from an input terminal 101 for outputting the output of the register 11 three bits to the left (the lower three bits being zeros) in the DCT processing, because the lower nine bits of the data are valid, or for directly outputting the output of the register 11 in the IDCT processing without bit shifting. A group of registers 13a, 13b, 13c, and 13d are responsive to a control signal (idfena) received from an input terminal 102 for updating the register output in each clock periods and holding the data throughout five clock periods (as denoted by dfb, dfc, dfd, and dfe in FIGS. 4A to 5B). A selector 14 (sela) is responsive to a control signal (isela) input from an input terminal 103 for releasing the data held in the registers 13a, 13b, 13c, and 13d in a reverse of the input sequence (as denoted by sela in FIGS. 4A to 5B).

Selectors 15a and 15b are arranged responsive to a control signal (idfela) input from the input terminal 102 for selecting the output of the shifter 12 and the output of the selector 14 respectively in every four clock periods. As a result, eight data input by one data per clock period from the input terminal 100 are output by two units of data per clock period in four clock periods. In the succeeding four clock periods, the transposition processor output data (rdo[31:0]) input from the input terminals 104a and 104b are output at the rate of two date per clock period (as denoted by selb[31:16] and selb[15:0] in FIGS. 4A to 5B). The output of the shifter 12 and the output of the selector 14 are shifted three bits to the left (the lower three bits being zeros) by the selectors 15a and 15b for one bit code expansion and output as 16-bits data. Selectors 16a and 16b are responsive to a control signal (iselc) input from an input terminal 105 for modifying the outputs of the selectors 16a and 16b so that the sequence is suitable for the arithmetic operation in the eight-point orthogonal transformation processor and outputting them as ido[31:0]. As shown in FIGS. 4A to 5B as well as Tables 5 and 6, the control for selectively outputting the input from the transposition processor 4 is identical between the DCT processing and the IDCT processing while the control for selectively outputting the input from the input terminal 100 is different between the DCT processing and the IDCT processing.

Figure 6:
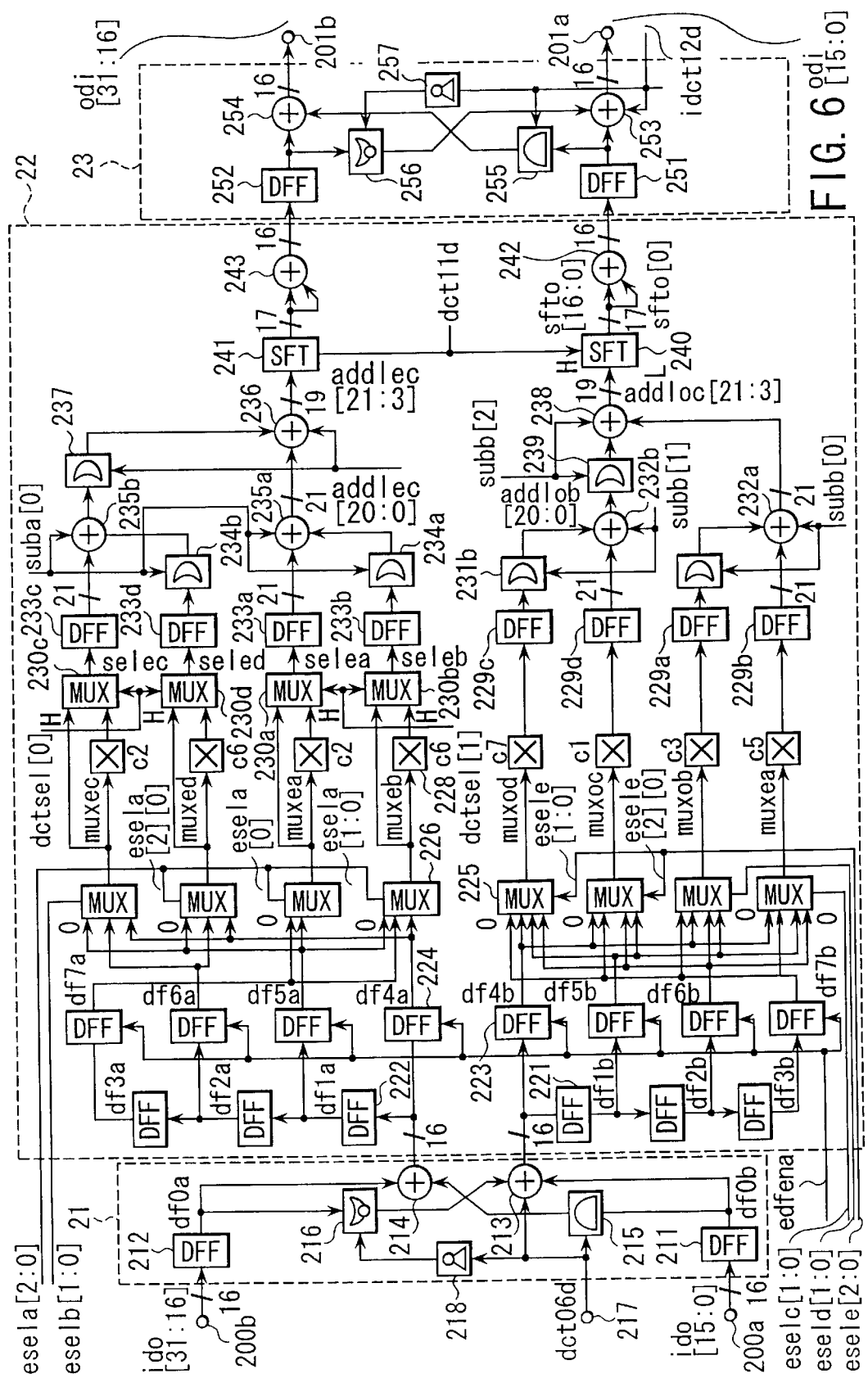
FIG. 6 is a block diagram showing a circuit arrangement of a one-dimensional DCT/IDCT processor 2 in the embodiment.

FIG. 6 is a block diagram showing an arrangement example of the eight-point orthogonal transformation processor 2 which comprises a DCT addition/subtraction processor 21, a sum-of-products processor 22 for fixed multiply (16 bits input and 21 bits output), and an IDCT addition/subtraction processor 23. The fixed multipliers used in the arrangement are classified into six different types as shown in Table 7. The total number is eight as each of the multipliers c2 and c6 is provided two units for the function of the DCT and IDCT processings. FIGS. 7A to 13B schematically illustrate an operation of DCT and IDCT processing of 8×8 data as switching between the two processings on the basis of a block.

TABLE 7

| Multiplier | Formula |
|---|---|
| c2 | $\sqrt{2} \cos \pi/8$ |
| c6 | $\sqrt{2} \sin \pi/8$ |
| c1 | $\sqrt{2} \cos \pi/16$ |
| c7 | $\sqrt{2} \sin \pi/16$ |
| c3 | $\sqrt{2} \cos 3\pi/16$ |
| c5 | $\sqrt{2} \sin 3\pi/16$ |

TABLE 8

| Arithmetic expression | x(4) + x(3) | x(4) − x(3) | x(2) + x(5) | x(2) − x(5) | x(6) + x(1) | x(6) − x(1) | x(0) + x(7) | x(0) − x(7) |
|---|---|---|---|---|---|---|---|---|
| Intermediate signal | z(4) | z(3) | z(2) | z(5) | z(6) | z(1) | z(0) | z(7) |

TABLE 9

| ido[31:16] | x(4) | x(2) | x(6) | x(0) |  |
|---|---|---|---|---|---|
| ido[15:0] | x(3) | x(5) | x(1) | x(7) |  |
| add0a[15:0] |  | z(4) | z(2) | z(6) | z(0) |
| add0b[15:0] |  | z(3) | z(5) | z(1) | z(7) |

TABLE 10

| ido[31:16] | f(4) | f(2) | f(6) | f(0) |  |
|---|---|---|---|---|---|
| ido[15:0] | f(3) | f(5) | f(1) | f(7) |  |
| add0a[15:0] |  | f(4) | f(2) | f(6) | f(0) |
| add0b[15:0] |  | f(3) | f(5) | f(1) | f(7) |

The DCT addition/subtraction processor 21 includes DFFs (D ytpe flip-flops) 21a and 21b connected to input terminals 200a and 200b, and adders 213 and 214 connected

TABLE 5

| Input (dti [11:0]) | x(0) | x(1) | x(2) | x(3) | x(4) | x(5) | x(6) | x(7) |
|---|---|---|---|---|---|---|---|---|
| ido [31:16] |  |  |  |  | x(3) | x(5) | x(1) | x(7) |
| ido [15:0] |  |  |  |  | x(4) | x(2) | x(6) | x(0) |

TABLE 6

| Input (dti [11:0]) | g(0) | g(1) | g(2) | g(3) | g(4) | g(5) | g(6) | g(7) |
|---|---|---|---|---|---|---|---|---|
| ido [31:16] |  |  |  |  | g(4) | g(2) | g(6) | g(0) |
| ido [15:0] |  |  |  |  | g(3) | g(5) | g(1) | g(7) | to the outputs of the two DFFs 21a and 21b respectively. The outputs of the DFFs 21a and 21b are also connected via an AND gate 215 and a NOR gate 216 to the adder 214 and the adder 213, respectively. A control terminal 217 is connected directly to the adder 213 and the AND gate 215 and via an inverter 218 to the NOR gate 216.

Figure 7A:
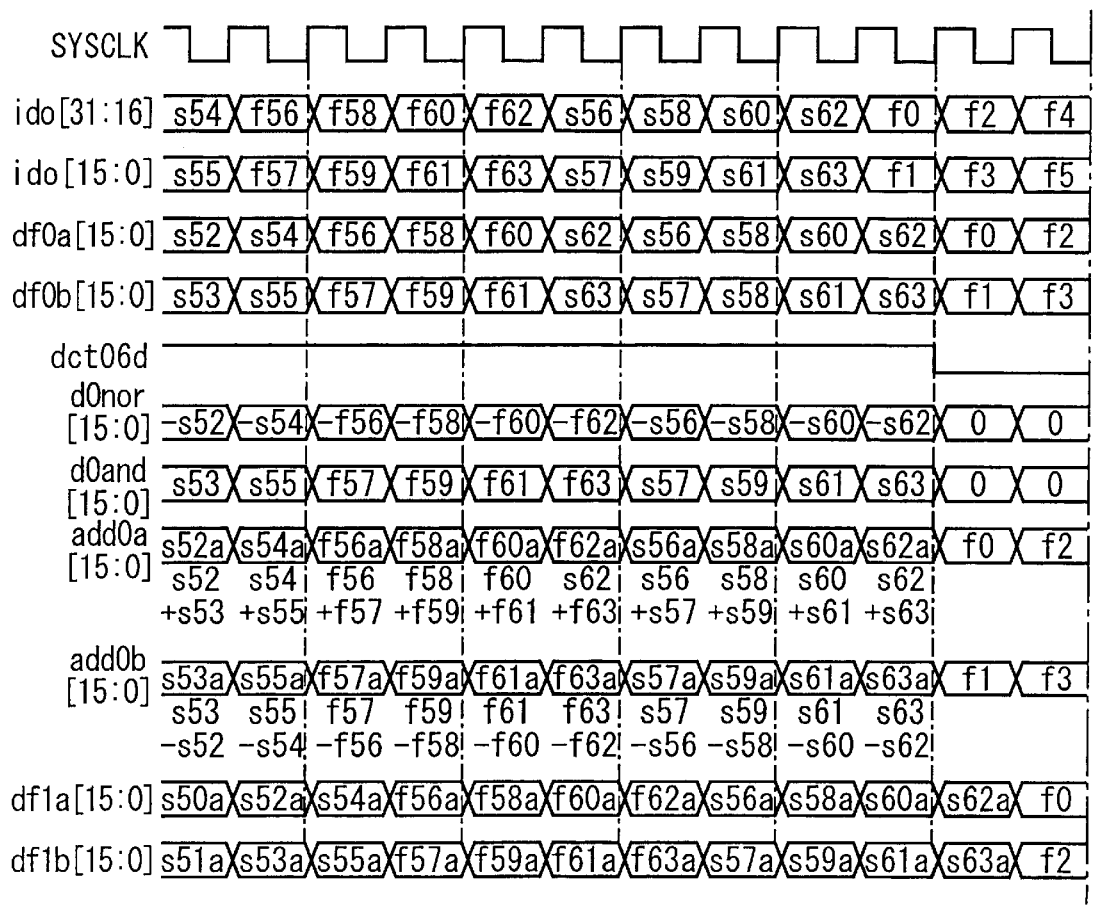
FIGS. 7A and 7B are diagrams schematically showing an action of the one-dimensional DCT/IDCT processor 2 in the embodiment.
Figure 7B:
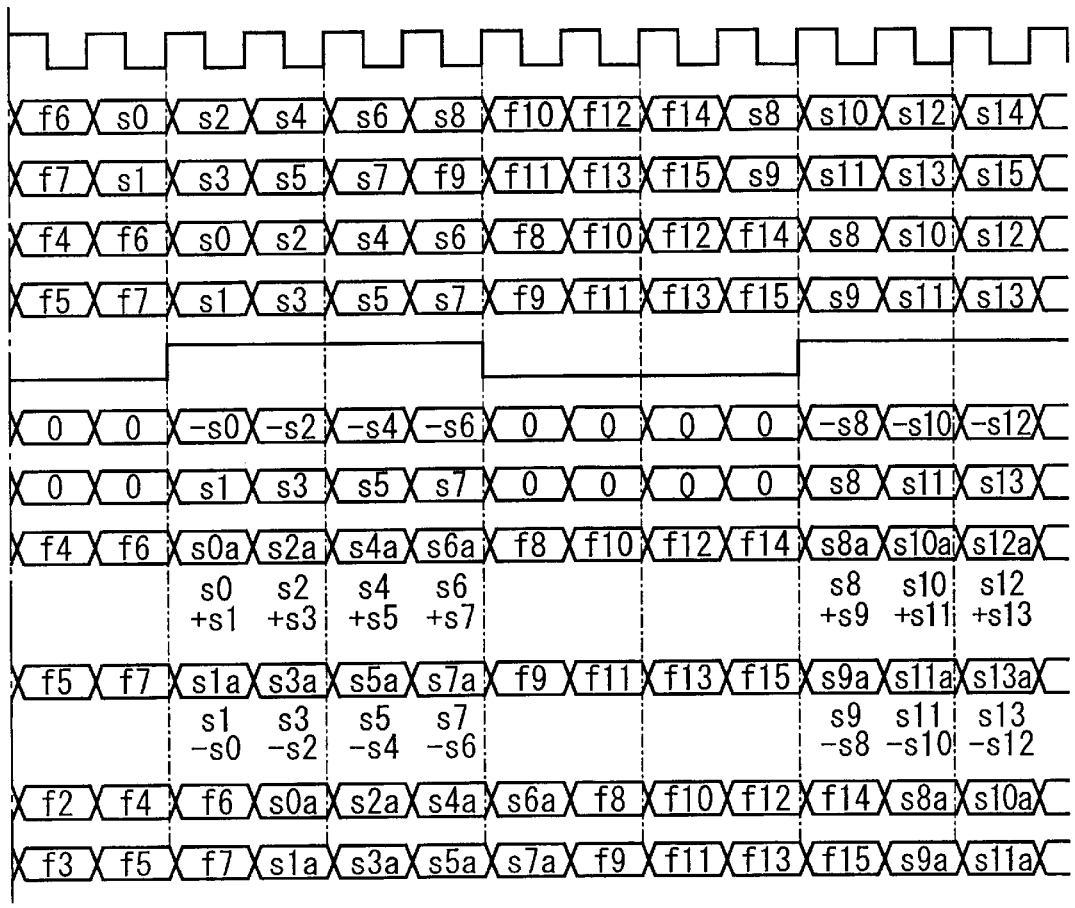
Figure 8A:
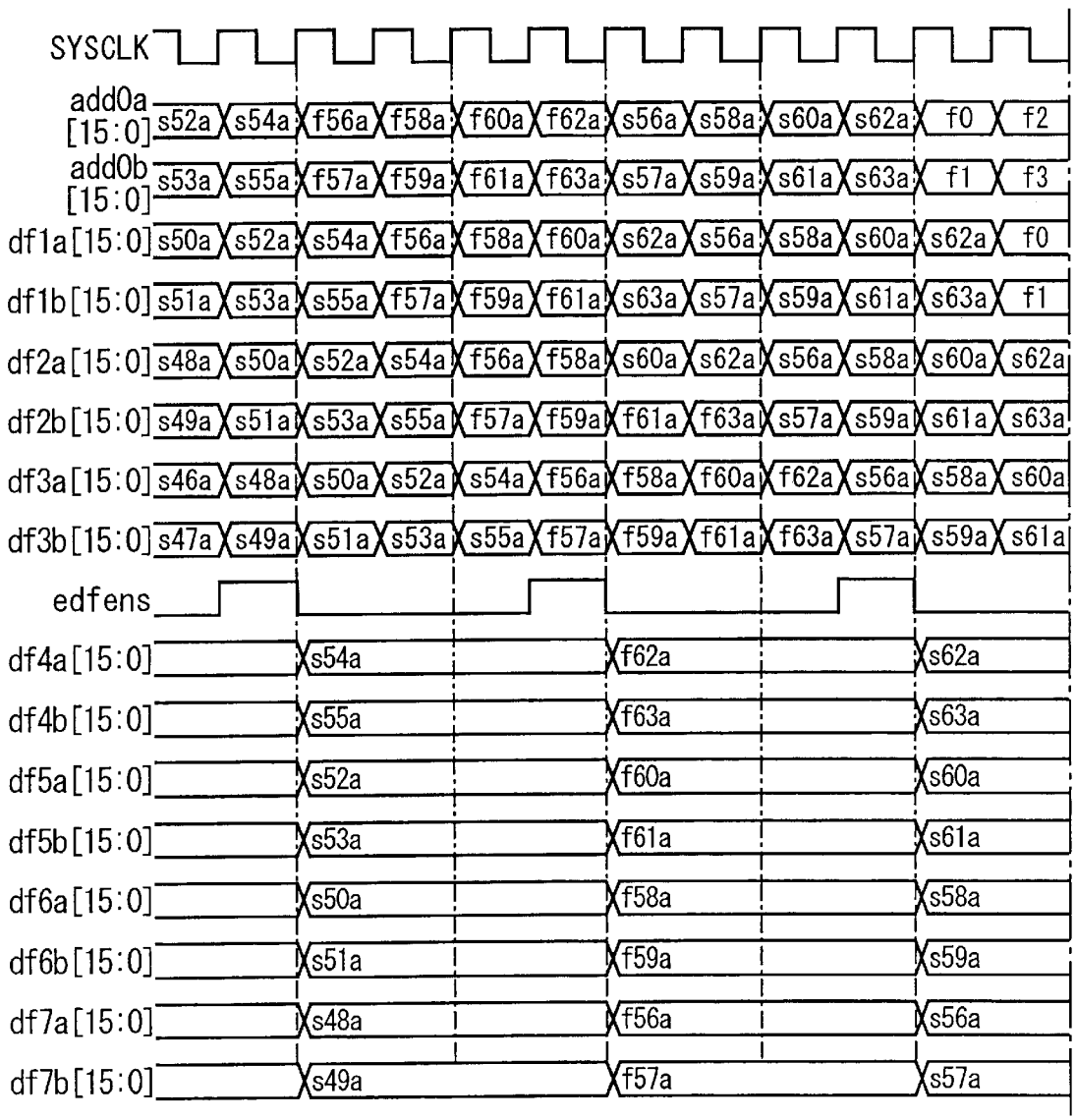
FIGS. 8A and 8B are diagrams schematically showing an action of the one-dimensional DCT/IDCT processor 2 in the embodiment of the present invention.
Figure 8B:
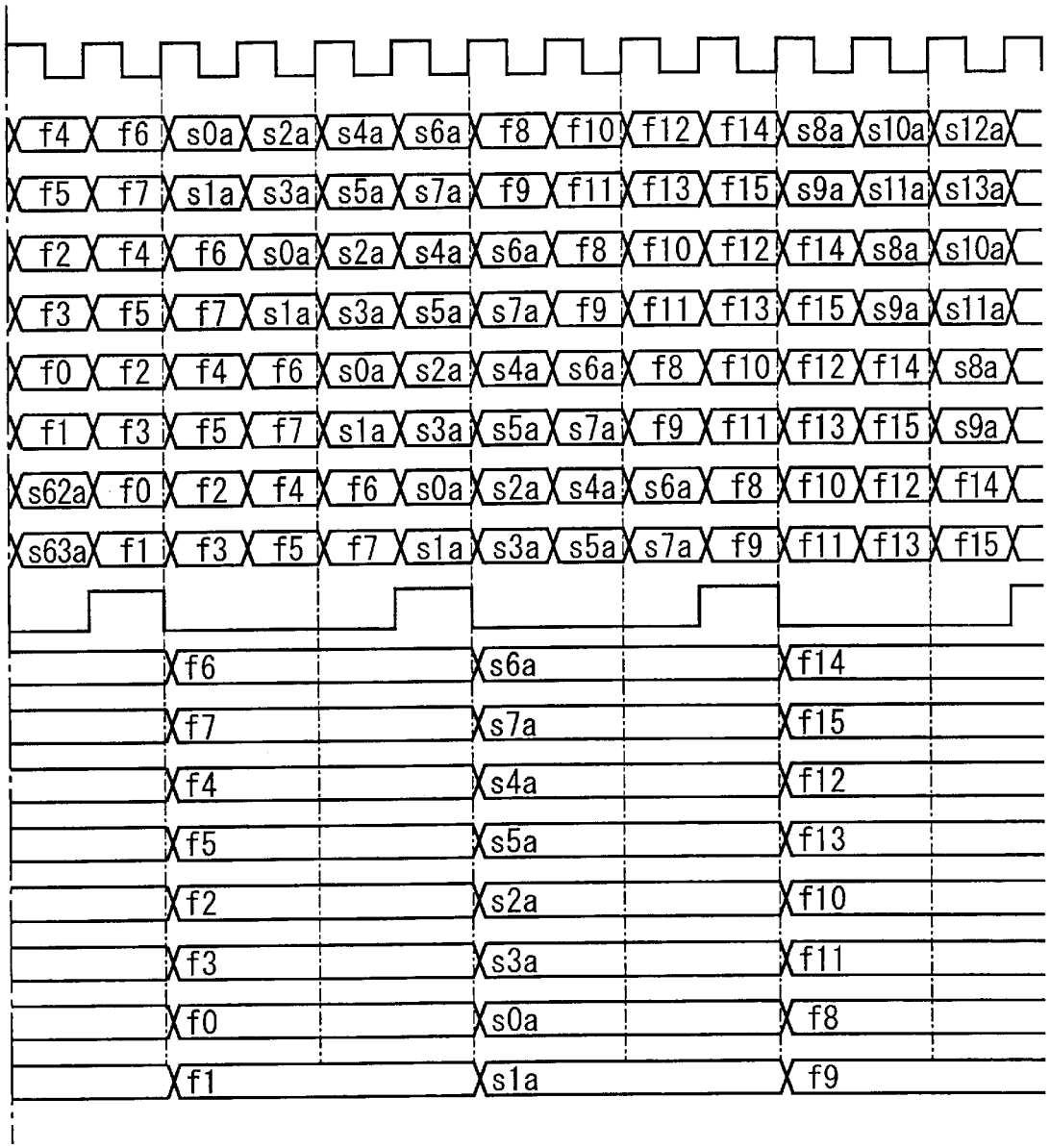
Figure 9A:
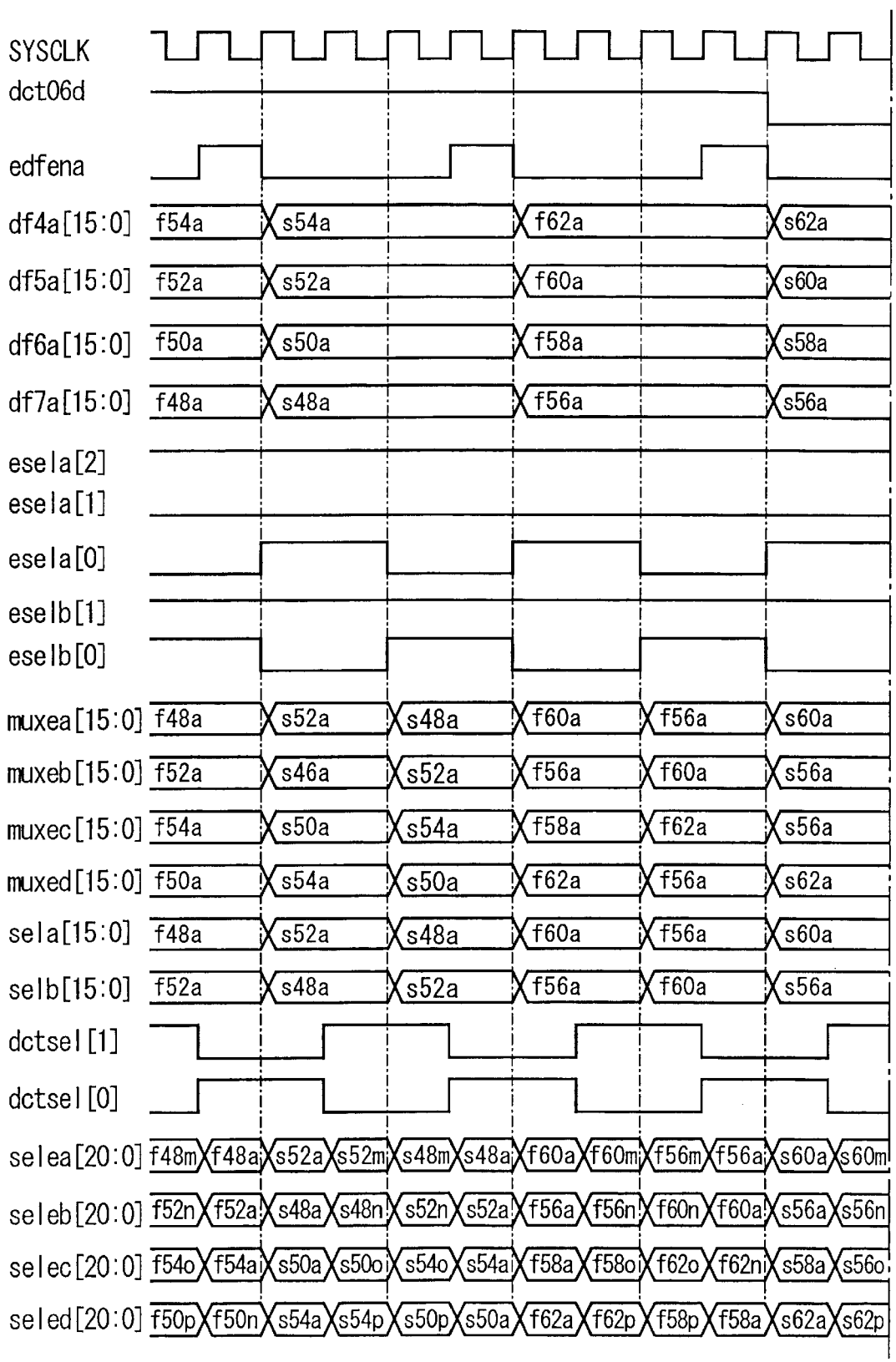
FIGS. 9A and 9B are diagrams schematically showing an action of the one-dimensional DCT/IDCT processor 2 in the embodiment of the present invention.
Figure 9B:
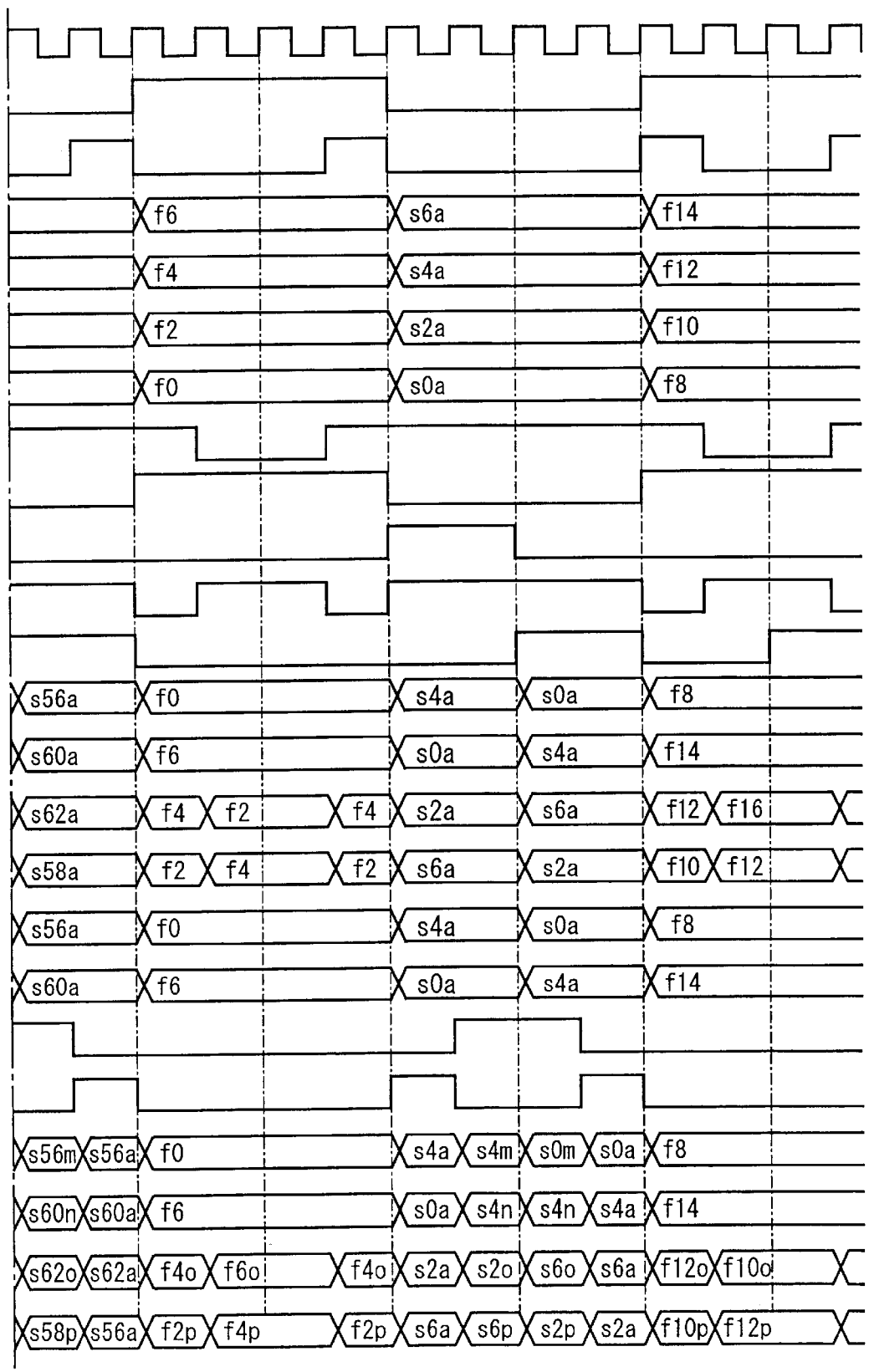
Figure 10A:
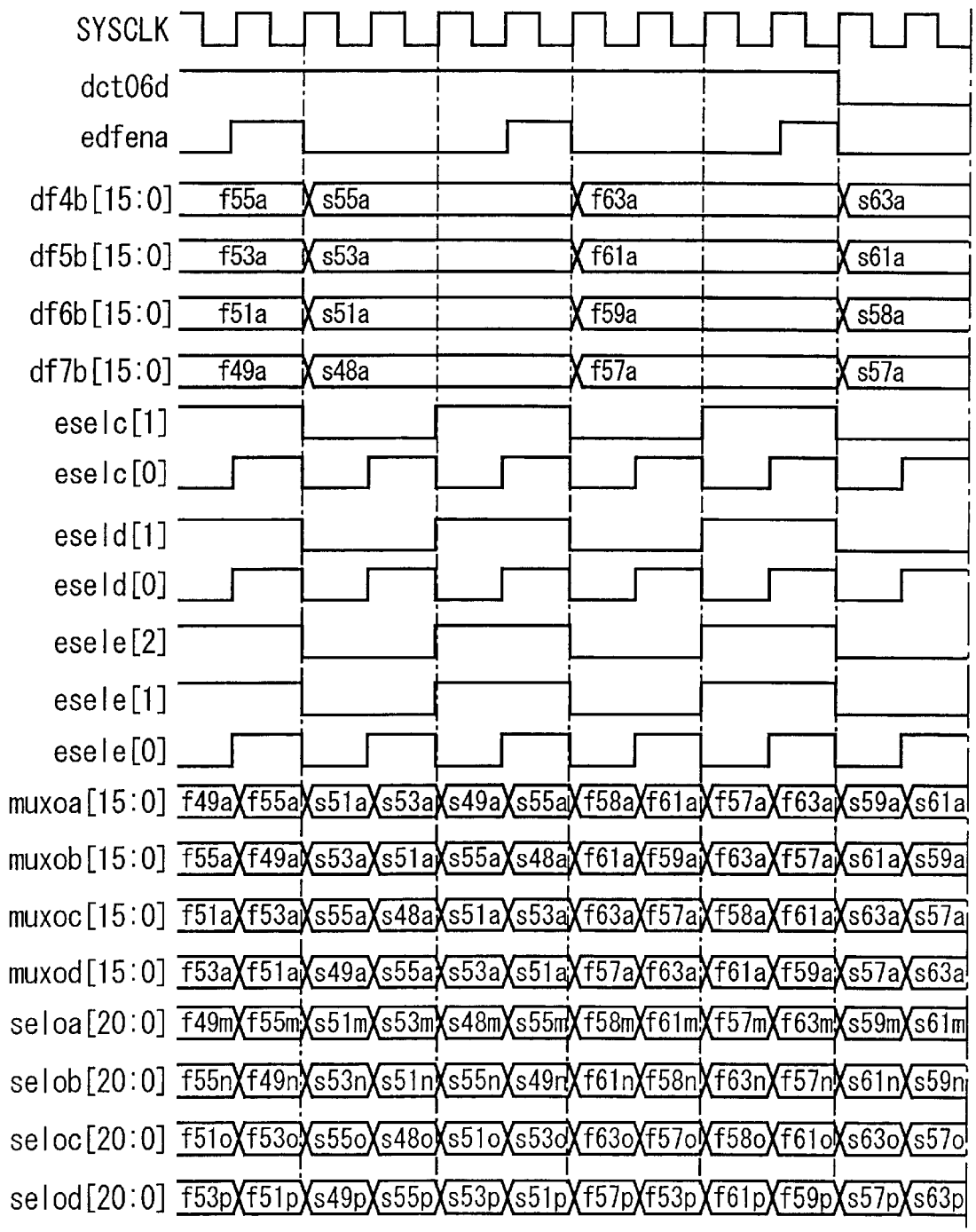
FIGS. 10A and 10B are diagrams schematically showing an action of the one-dimensional DCT/IDCT processor 2 in the embodiment of the present invention.
Figure 10B:
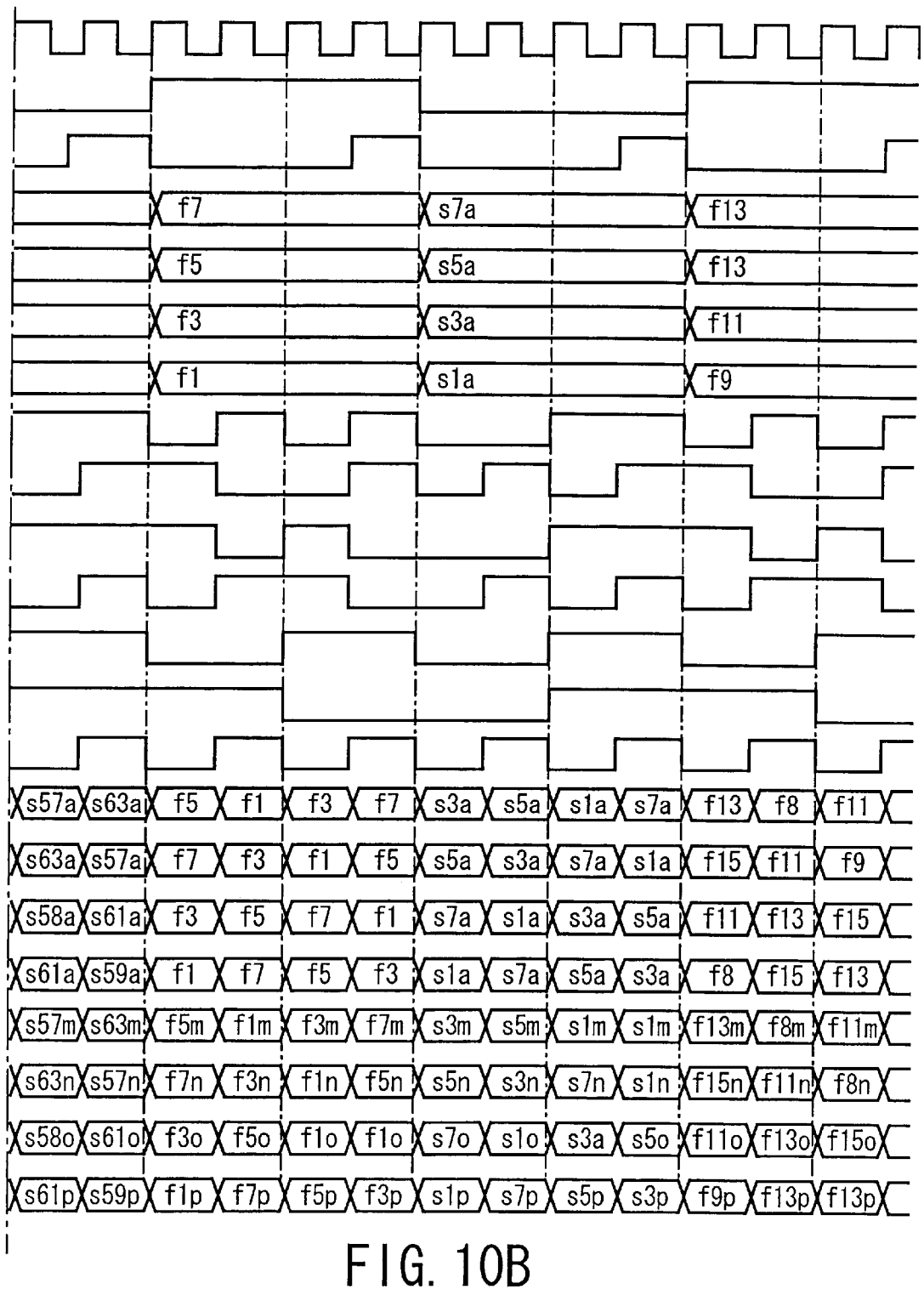
Figure 11A:
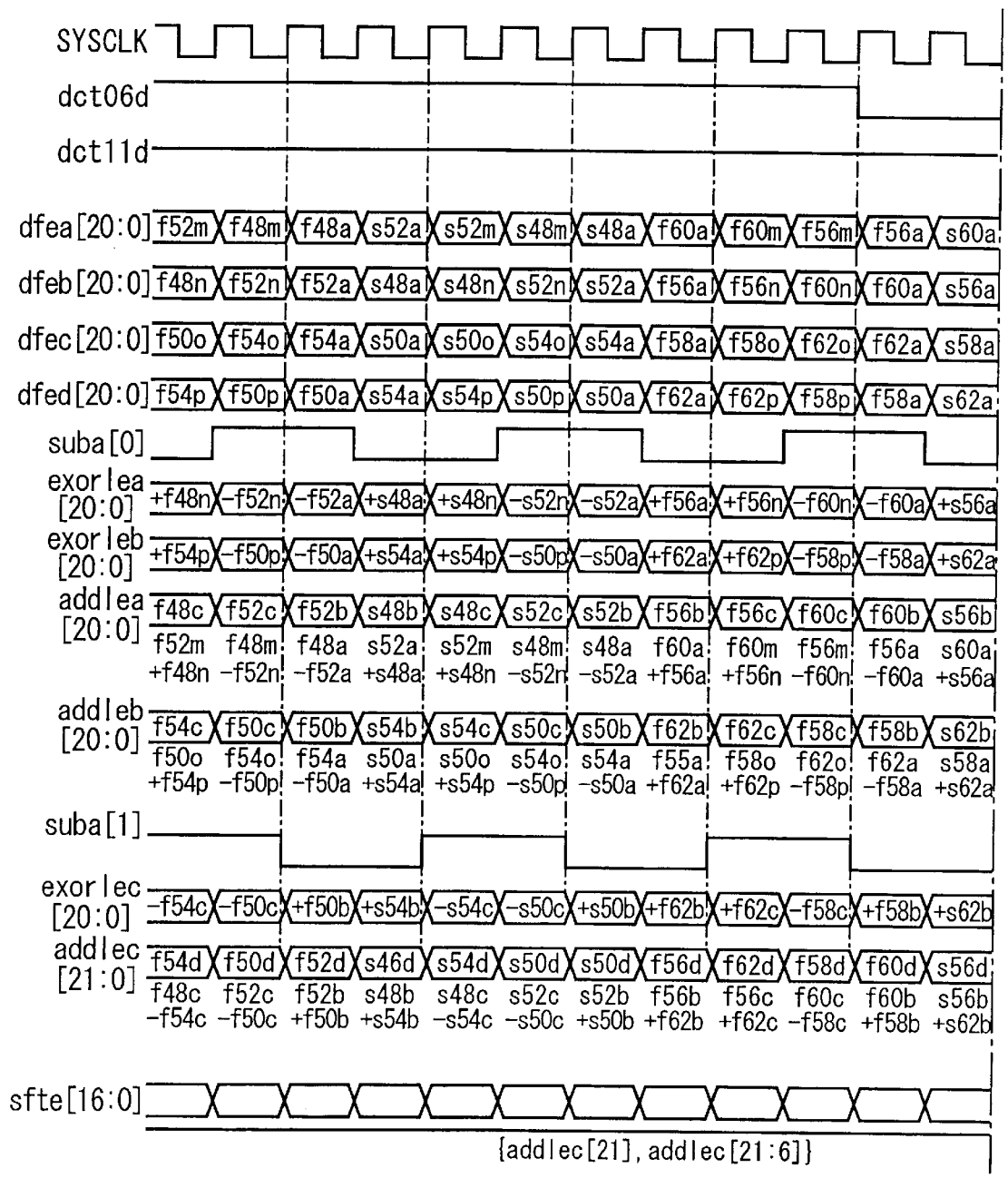
FIGS. 11A and 11B are diagrams schematically showing an action of the one-dimensional DCT/IDCT processor 2 in the embodiment of the present invention.
Figure 11B:
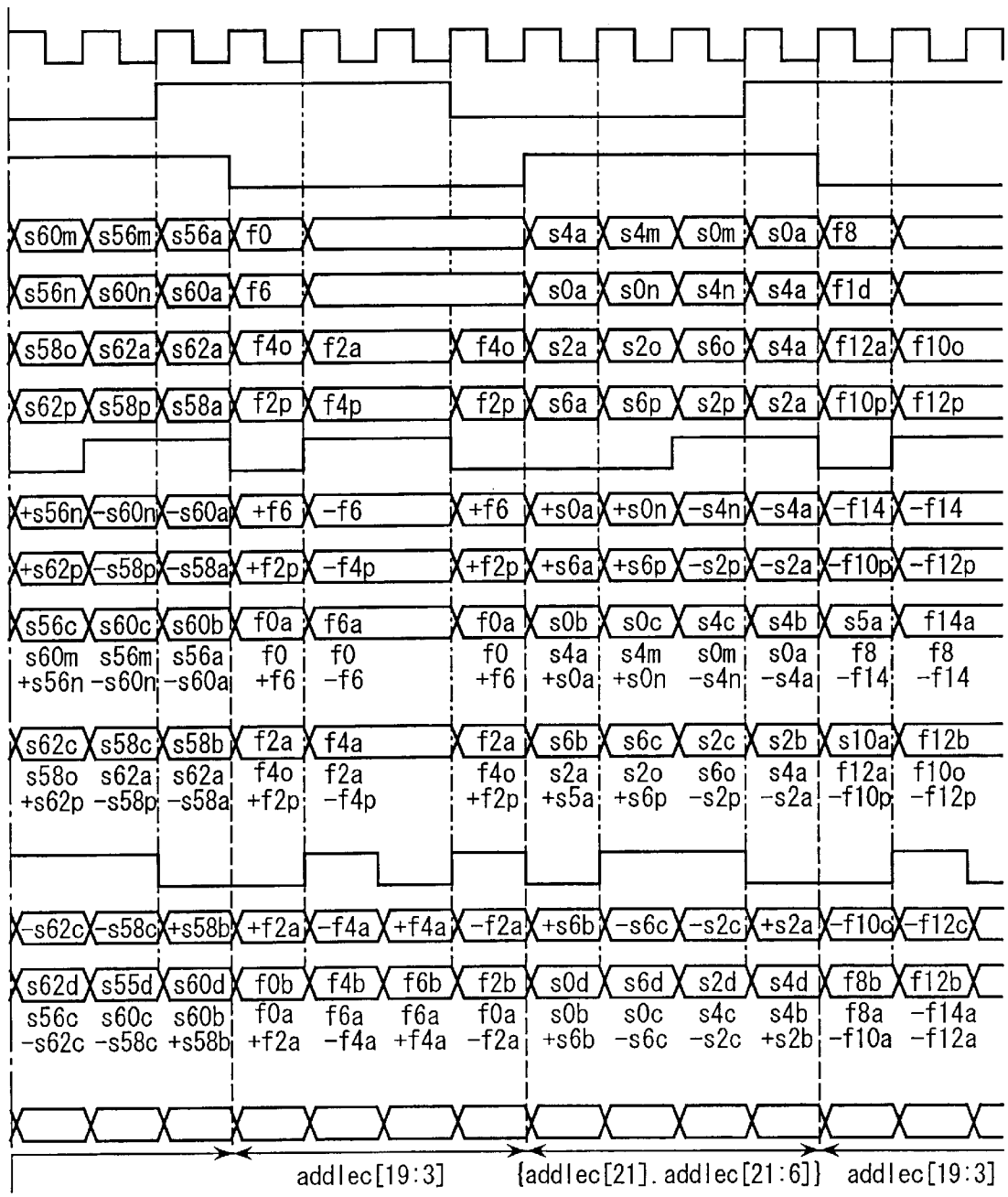
Figure 12A:
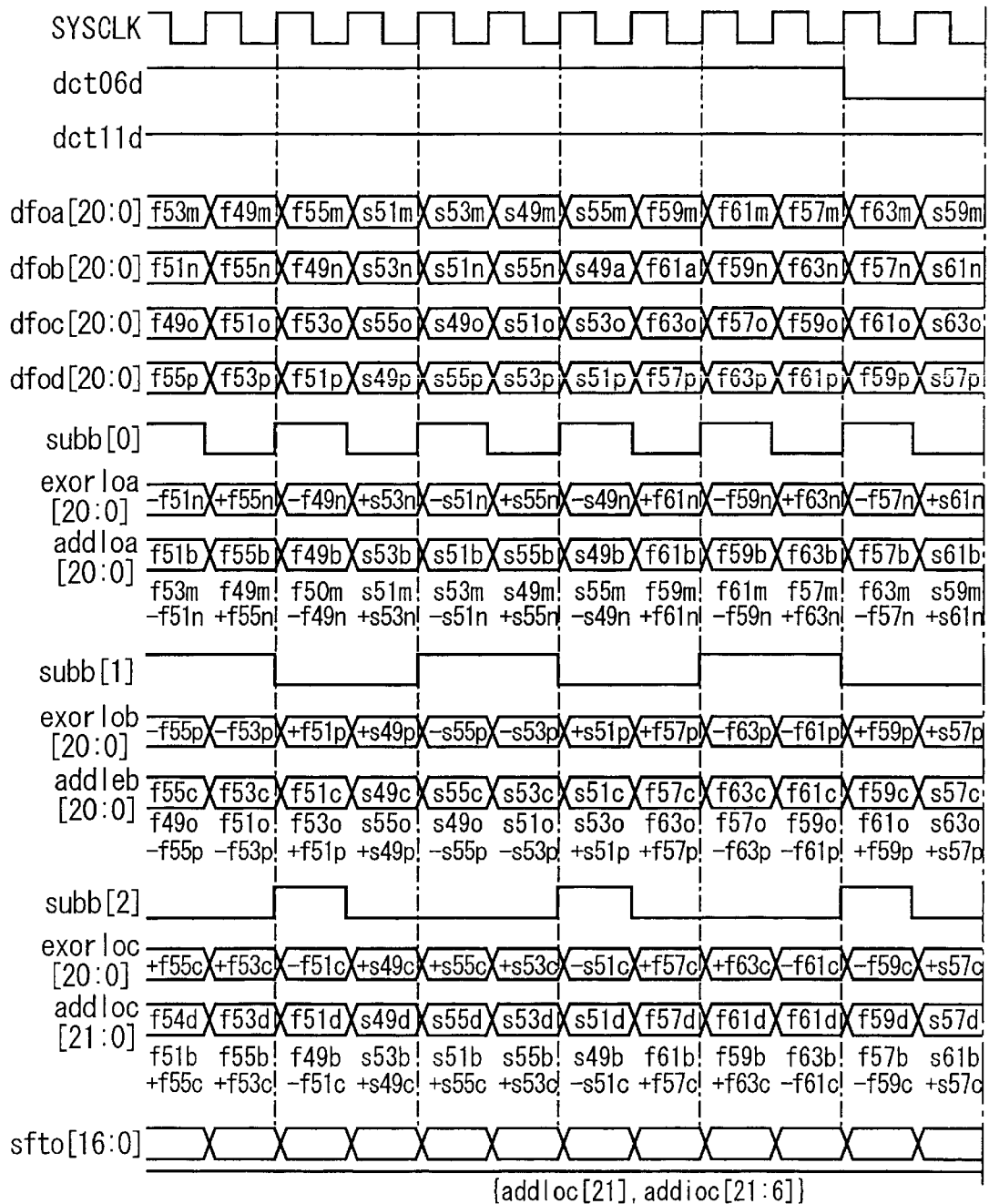
FIGS. 12A and 12B are diagrams schematically showing an action of the one-dimensional DCT/IDCT processor 2 in the embodiment of the present invention.
Figure 12B:
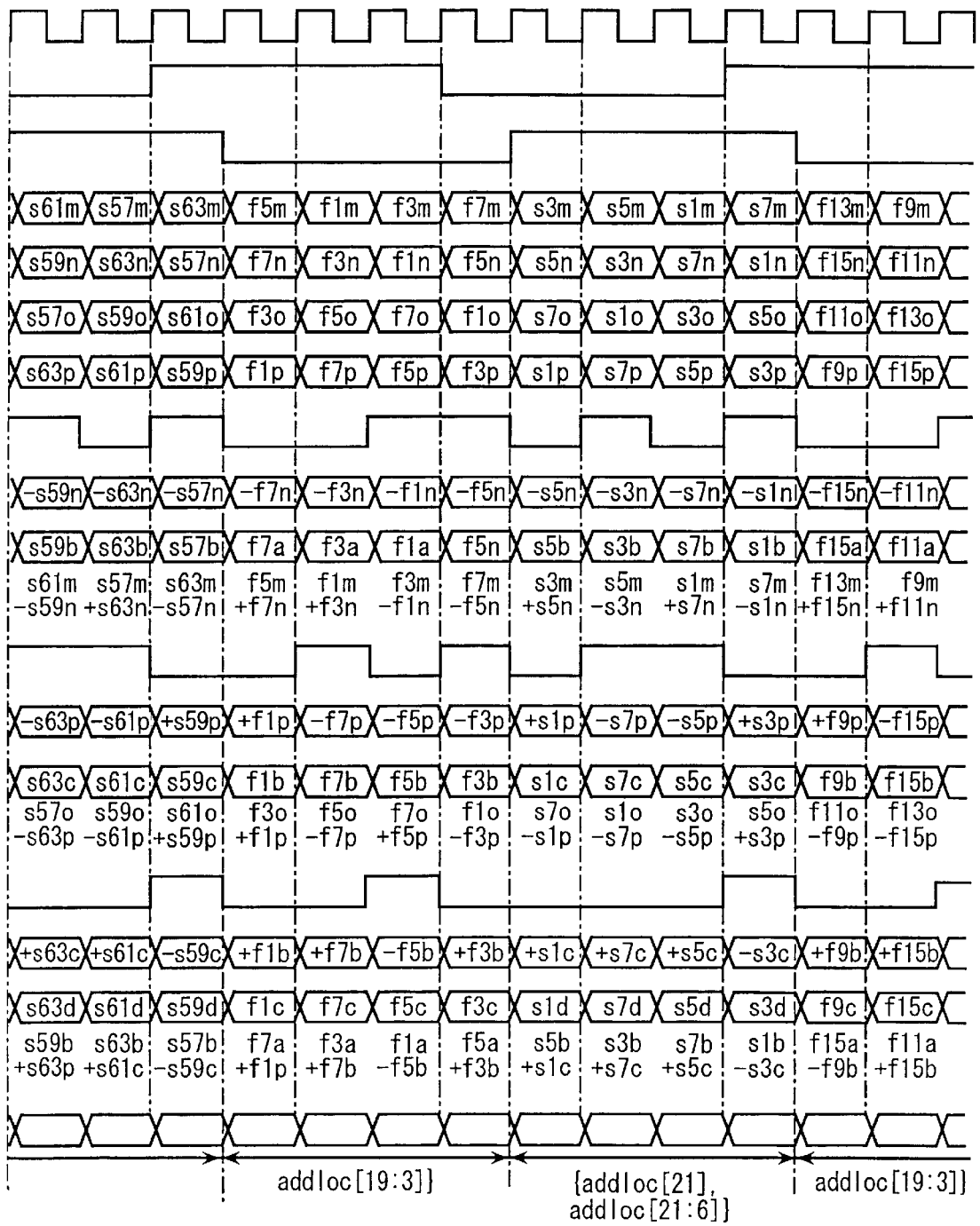

For the DCT processing in the DCT addition/subtraction processor 21, for pixel data $x(0), x(1), \ldots, x(7)$ input from the input terminals 200a and 200b, DCT intermediate signals $z(0), z(1), \ldots, z(7)$ according to the arithmetic operation shown in Table 8 are generated and then output in the sequence shown in Table 9. For the IDCT processing, with one of two inputs of adders controlled to zero, DCT coefficients $f(0), f(1), \ldots, f(7)$ input from the input terminals 200a and 200b are directly output in the sequence as shown in Table 10. FIGS. 7A and 7B illustrate the timing of operation in the DCT addition/subtraction processor 21.

TABLE 11

| Intermediate signal DCT | z(0) | z(2) | z(4) | z(6) |
|---|---|---|---|---|
| F(0) | 1 | +1 | +1 | +1 |
| F(6) | c6 | +c2 | −c6 | −c2 |
| F(2) | c2 | −c6 | −c2 | +c6 |
| F(4) | 1 | −1 | +1 | −1 |
| Intermediate signal DCT | z(7) | z(5) | z(3) | z(1) |
| f(7) | c7 | +c3 | +c1 | +c5 |
| f(1) | c1 | +c5 | c7 | c3 |
| f(5) | c5 | +c7 | −c3 | +c1 |
| f(3) | c3 | −c1 | +c5 | +c7 |

TABLE 12

| Multiply coefficient DCT | 1 | 1 | | 1 | 1 | |
|---|---|---|---|---|---|---|
| | c2 | c6 | | c2 | c6 | ) |
| f(0) | z(2) | +z(0) | +( | z(6) | +z(4) | ) |
| f(6) | z(2) | +z(0) | −( | z(6) | +z(4) | ) |
| f(2) | z(0) | −z(2) | −( | z(4) | −z(6) | ) |
| f(4) | z(0) | −z(2) | +( | z(4) | −z(6) | ) |
| Multiply coefficient DCT | c5 | c3 | | c1 | c7 | |
| f(7) | z(1) | +z(5) | +( | z(3) | +z(7) | ) |
| f(1) | z(5) | −z(1) | +( | z(7) | −z(3) | ) |
| f(5) | z(7) | −z(3) | +( | z(1) | +z(5) | ) |
| f(3) | z(3) | +z(7) | −( | z(5) | −z(1) | ) |

TABLE 13

| Multiply coefficient DCT | 1 | 1 | 1 | 1 |
|---|---|---|---|---|
| | c2 | c6 | c2 | c(6) |
| f(0) | df5a | df7a | df6a | df4a |
| f(6) | df5a | df7a | df6a | df4a |
| f(2) | df7a | df5a | df4a | df6a |
| f(4) | df7a | df5a | df4a | df6a |
| Multiply coefficient DCT | c5 | c3 | c1 | c7 |

TABLE 13-continued

| | | | | |
|---|---|---|---|---|
| f(7) | df6b | df5b | df4b | df7b |
| f(1) | df5b | df6b | df7b | df4b |
| f(5) | df7b | df4b | df6b | df5b |
| f(3) | df4b | df7b | df5b | df6b |

TABLE 14

| DCT Intermediate signal | f(0) | f(2) | f(4) | f(6) |
|---|---|---|---|---|
| z(0) | 1 | +c2 | +1 | +c6 |
| z(6) | 1 | +c6 | −1 | −c2 |
| z(2) | 1 | −c6 | −1 | +c2 |
| z(4) | 1 | −c2 | +1 | −c6 |
| DCT Intermediate signal | f(1) | f(3) | f(5) | f(7) |
| z(7) | +c1 | +c3 | +c5 | +c7 |
| z(1) | −c3 | +c7 | +c1 | +c5 |
| z(5) | +c5 | −c1 | +c7 | +c3 |
| z(3) | −c7 | +c5 | −c3 | +c1 |

For the DCT processing, the sum-of-products processor 22 includes first groups of DFFs 221 and 222 connected to the outputs of the adders 213 and 214 of the DCT addition/subtraction processor 21 and second groups of DFFs 223 and 224. The DFFs 221 and 222 in the first group are connected one another in three steps. The DFFs 223 and 224 of the second groups include DFFs connected to the adders 213 and 214 respectively and the DFFs connected to the outputs of the DFFs of the first group. Also, a control signal edfena is input to the DFFs 223 and 224 of the second groups.

The DFFs 223 and 224 of the second group are selectively connected to selectors (MUX) 225 and 226. More particularly, outputs of the DFF 223 are connected to all inputs of the selectors 225 while outputs of the DFF 224 are connected to three inputs of the selectors 226. The output of the selector 225 is connected via a multiplier 227 to a DFF 229. The output of the selector 226 is connected via a multiplier 228 to one of two inputs of a selector 230 and directly to the other input of the selector 230. A control signal dctsel[1] is input to the selectors 230a and 230b, and a control signal dctsel[0] is input to the selectors 230c and 230d.

The DFF 229a of the DFFs 290 is connected via an OR gate 231a to an adder 232a. The DFF 229b is connected directly to the adder 232a. Similarly, the DFF 229c is connected via an OR gate 231b to an adder 232b while the DFF 229d is connected directly to the adder 232b.

The output of the selector 230 is connected to an input of the DFF 233. The DFF 233b of the DFFs 233 is connected via an OR gate 234a to an adder 235a. The DFF 233a is connected directly to the adder 235a. Similarly, the DFF 233d is connected via an OR gate 234b to an adder 235b while the DFF 233c is connected directly to the adder 235b. The adder 235a is connected directly to an adder 236 while the adder 235b is connected via an OR gate 237 to the adder 236.

The adder 232a is connected directly to an adder 238 while the adder 232b is connected via an OR gate 239 to the adder 238. The outputs of the adders 236 and 238 are connected via bit shifters (SFT) 241 and 240 to adder 243 and 242, respectively.

For the DCT processing in the sum-of-products processor 22, the input DCT intermediate signals z(0), z(1), . . . , z(7) are subjected to the sum-of-products operation shown in Table 11 and the results are output as f(0), f(1), . . . , f(7). As the multiply coefficients of the multipliers are fixed in this arrangement example, the transformation results are output by inputting the DCT intermediate values into the multiplier as shown in Table 12. Table 13 illustrates a control example of selecting the registers for the transformation. For the IDCT processing in the sum-of-products processor 22, the input DCT coefficients f(0), f(1), . . . , f(7) are subjected to the sum-of-products operation shown in Table 14 and the results are output as the transformation intermediate signals z(0), z(1), . . . , z(7). As the multiply coefficients of the multipliers are fixed in this arrangement, the transformation intermediate signals are output by inputting the DCT coefficients f(0), f(1), . . . , f(7) into the corresponding multiplier as shown in Table 15.

TABLE 15

| Multiply coefficient Intermediate signal | 1 | 1 | | $c_2$ | $c_6$ | |
|---|---|---|---|---|---|---|
| z(0) | f(0) | +f(4) | +( | f(2) | +f(6) | ) |
| z(6) | f(0) | −f(4) | −( | f(6) | −f(2) | ) |
| z(2) | f(0) | −f(4) | +( | f(6) | −f(2) | ) |
| z(4) | f(0) | +f(4) | −( | f(2) | +f(6) | ) |

| Multiply coefficient Intermediate signal | $c_5$ | $c_3$ | | $c_1$ | $c_7$ | |
|---|---|---|---|---|---|---|
| z(7) | f(5) | +f(3) | +( | f(1) | +f(7) | ) |
| z(1) | f(7) | −f(1) | +( | f(5) | +f(3) | ) |
| z(5) | f(1) | +f(7) | −( | f(3) | −f(5) | ) |
| z(3) | f(3) | −f(5) | +( | f(7) | −f(1) | ) |

TABLE 16

| Multiply coefficient Intermediate signal | 1 | 1 | $c_2$ | $c_6$ |
|---|---|---|---|---|
| z(0) | df7a | df4a | df5a | df6a |
| z(6) | df7a | df4a | df6a | df5a |
| z(2) | df7a | df4a | df6a | df5a |
| z(4) | df7a | df4a | df5a | df6a |

| Multiply coefficient Intermediate signal | $c_5$ | $c_3$ | $c_1$ | $c_7$ |
|---|---|---|---|---|
| z(7) | df5a | df4a | df6a | df7a |
| z(1) | df7a | df6a | df5a | df4a |
| z(5) | df6a | df7a | df4a | df5a |
| z(3) | df4a | df5a | df7a | df6a |

Table 16 illustrates a control example of selecting the registers for the transformation intermediate processing. Assuming that the fixed multipliers is designed for converting 16-bit input to 21-bit output and also the selectors 230a, 230b, 230c, and 230d for selectively outputting the input and the output of the fixed multiplier selectively output the fixed multiplier input data with four bits shifted to the left (the lower four bits being zeros) for one-bit code expansion.

TABLE 17

| Multiply coefficient Select signal | 1 ($c_2$) | 1 ($c_6$) | 1 $c_2$ | 1 $c_6$ |
|---|---|---|---|---|
| 00 | df7a | df5a | df5a | df5a |
| 01 | df5a | df7a | | |
| 10 | | df4a | df6a | df6a |
| 11 | | | df4a | df4a |

| Multiply coefficient Select signal | $c_6$ | $c_3$ | $c_1$ | $c_{17}$ |
|---|---|---|---|---|
| 00 | df6b | df5b | df4b | df7b |
| 01 | df5b | df6b | df7b | df4b |
| 10 | df7b | df4b | df6b | df5b |
| 11 | df4b | df7b | df5b | df6b |

TABLE 18

| Multiply coefficient DCT | 1 ($c_2$) | 1 ($c_6$) | 1 $c_2$ | 1 $c_6$ |
|---|---|---|---|---|
| f(0) | 1 | 01 | 10 | 11 |
| f(6) | 1 | 01 | 10 | 11 |
| f(2) | 0 | 00 | 11 | 10 |
| f(4) | 0 | 00 | 11 | 10 |

| Multiply coefficient DCT | $c_5$ | $c_3$ | $c_1$ | $c_7$ |
|---|---|---|---|---|
| f(7) | 00 | 00 | 00 | 00 |
| f(1) | 01 | 01 | 01 | 01 |
| f(5) | 10 | 10 | 10 | 10 |
| f(3) | 11 | 11 | 11 | 11 |

TABLE 19

| Multiply coefficient Intermediate signal | 1 | 1 | $c_2$ | $c_6$ |
|---|---|---|---|---|
| z(0) | 0 | 10 | 00 | 10 |
| z(6) | 0 | 10 | 10 | 00 |
| z(2) | 0 | 10 | 10 | 00 |
| z(4) | 0 | 10 | 00 | 10 |

| Multiply coefficient Intermediate signal | $c_5$ | $c_3$ | $c_1$ | $c_7$ |
|---|---|---|---|---|
| z(7) | 01 | 10 | 10 | 00 |
| z(1) | 10 | 01 | 11 | 01 |
| z(5) | 00 | 11 | 00 | 10 |
| z(3) | 11 | 00 | 01 | 11 |

TABLE 20

| | 8 point DCT | | | | 8 point IDCT | | | |
|---|---|---|---|---|---|---|---|---|
| timing | 0 | 1 | 2 | 3 | 0 | 1 | 2 | 3 |
| esela[2] | 1 | 1 | 1 | 1 | 1 | 0 | 0 | 1 |
| esela[1] | 0 | 0 | 0 | 0 | 1 | 1 | 1 | 1 |
| esela[0] | 1 | 1 | 0 | 0 | 0 | 0 | 0 | 0 |
| eselb[1] | 1 | 1 | 1 | 1 | 0 | 1 | 1 | 0 |
| eselb[0] | 0 | 0 | 1 | 1 | 0 | 0 | 0 | 0 |
| eselc[1] | 0 | 0 | 1 | 1 | 0 | 1 | 0 | 1 |

TABLE 20-continued

|  | 8 point DCT | | | | 8 point IDCT | | | |
| --- | --- | --- | --- | --- | --- | --- | --- | --- |
| timing | 0 | 1 | 2 | 3 | 0 | 1 | 2 | 3 |
| eselc[0] | 0 | 1 | 0 | 1 | 1 | 0 | 0 | 1 |
| eseld[1] | 0 | 0 | 1 | 1 | 1 | 0 | 1 | 0 |
| eseld[0] | 0 | 1 | 0 | 1 | 0 | 1 | 1 | 0 |
| esele[2] | 0 | 0 | 1 | 1 | 1 | 1 | 0 | 0 |
| esele[1] | 0 | 0 | 1 | 1 | 0 | 0 | 1 | 1 |
| esele[0] | 0 | 1 | 0 | 1 | 0 | 1 | 0 | 1 |
| dctsel[1] | 0 | 1 | 1 | 0 | 0 | 0 | 0 | 0 |
| dctsel[0] | 1 | 0 | 0 | 1 | 0 | 0 | 0 | 0 |

TABLE 21

|  | 8 point DCT | | | | 8 point IDCT | | | |
| --- | --- | --- | --- | --- | --- | --- | --- | --- |
| Timing | 0 | 1 | 2 | 3 | 0 | 1 | 2 | 3 |
| suba[1] | 0 | 1 | 2 | 3 | 0 | 1 | 2 | 3 |
| suba[0] | 0 | 0 | 1 | 1 | 0 | 1 | 1 | 0 |
| subb[2] | 0 | 0 | 0 | 1 | 0 | 0 | 1 | 0 |
| subb[1] | 0 | 1 | 1 | 0 | 0 | 1 | 0 | 1 |
| subb[0] | 0 | 1 | 0 | 1 | 0 | 0 | 1 | 1 |
| dct11d | 1 | 1 | 1 | 1 | 0 | 0 | 0 | 0 |

Table 17 illustrates a definition example of control signals for selecting the registers. Tables 18 and 19 illustrate a control example of selecting the registers for the DCT and IDCT processings based on the definition. Table 20 shows a pattern of four clock periods of the register selection control signals for the DCT and IDCT processings. Table 21 illustrates a pattern of four clock periods of control signals for addition and subtraction and bit shift processing for the DCT and IDCT processings. In the bit shifters 240 and 241, 16-bit data produced by eliminating the lower six bits of the output of the adder are one-bit code expanded for the DCT processing and, for the IDCT processing, the elimination of the upper two bits and the lower three bits from the output of the adder yields 17-bit data. The adders 242 and 243 are round-off circuits for rounding off the 17-bit data input from the bit shifters 240 and 241 in the positive direction to eliminate the lower one bit and outputting resultant 16-bit data. FIGS. 8A to 12B illustrate the timing of operation in the sum-of-products processor 22.

TABLE 22

| Arithmetic expression | z(0) + z(7) | z(0) z(7) | z(6) + z(1) | z(6) − z(1) | z(2) + z(5) | z(2) − z(5) | z(4) + z(3) | z(4) − z(3) |
| --- | --- | --- | --- | --- | --- | --- | --- | --- |
| Actual signal | x(0) | x(7) | x(6) | x(1) | x(2) | x(5) | x(4) | x(3) |

TABLE 23

| edo[31:16] | f(0) | f(6) | f(2) | f(4) |  |
| --- | --- | --- | --- | --- | --- |
| edo[15:0] | f(7) | f(1) | f(5) | f(3) |  |
| odi[31:16] |  | f(0) | f(6) | f(2) | f(4) |
| odi[15:0] |  | f(7) | f(1) | f(5) | f(3) |

TABLE 24

| edo[31:16] | z(0) | z(6) | z(2) | z(4) |  |
| --- | --- | --- | --- | --- | --- |
| edo[15:0] | z(7) | z(1) | z(5) | z(3) |  |

TABLE 24-continued

| odi[31:16] | x(0) | x(6) | x(2) | x(4) |
| --- | --- | --- | --- | --- |
| odi[15:0] | x(7) | x(1) | x(5) | x(3) |

The IDCT addition/subtraction processor 23 includes DFFs 251 and 252 connected to the outputs of the adders 242 and 243 of the sum-of-products processor 22 respectively, and adders 253 and 254 connected to the outputs of the DFFs 251 and 252 respectively. Also, the output of the DFF 251 is connected via an AND gate 255 to the adder 254 while the DFF 252 is connected via a NOR gate 256 to the adder 253. A control signal idctl2d is input to the adder 253 and the AND gate 255, and supplied via an inverter 257 to the NOR gate 256.

Figure 13A:
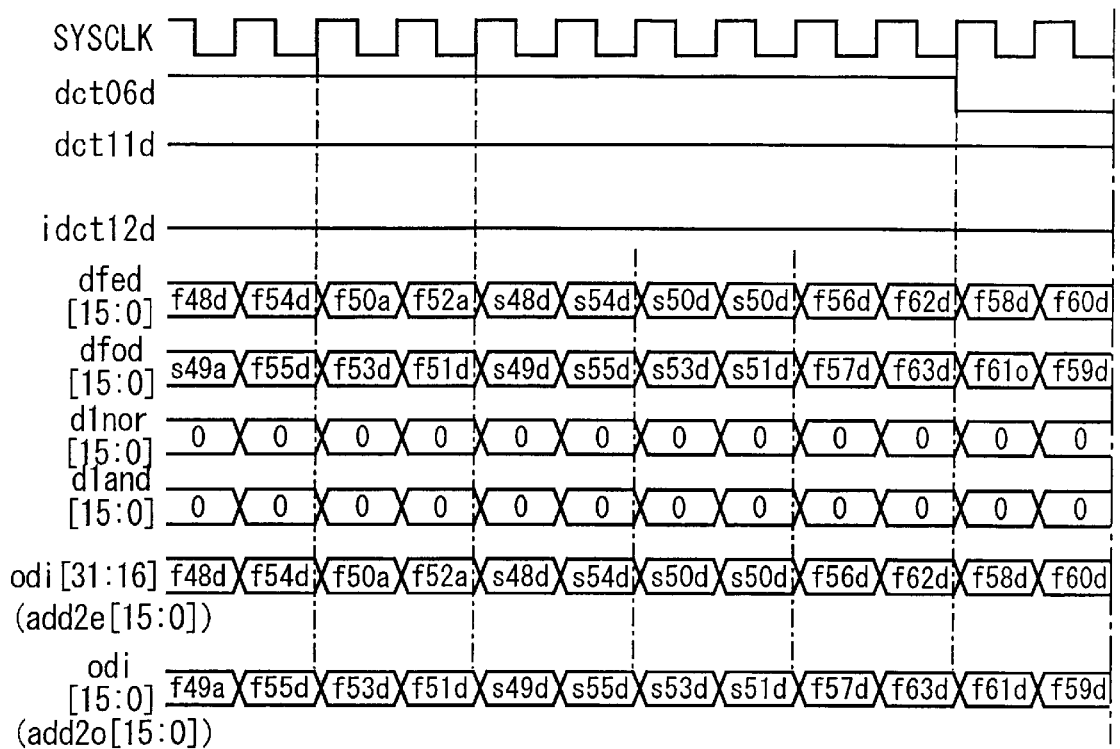
FIGS. 13A and 13B are diagrams schematically showing an action of the one-dimensional DCT/IDCT processor 2 in the embodiment of the present invention.
Figure 13B:
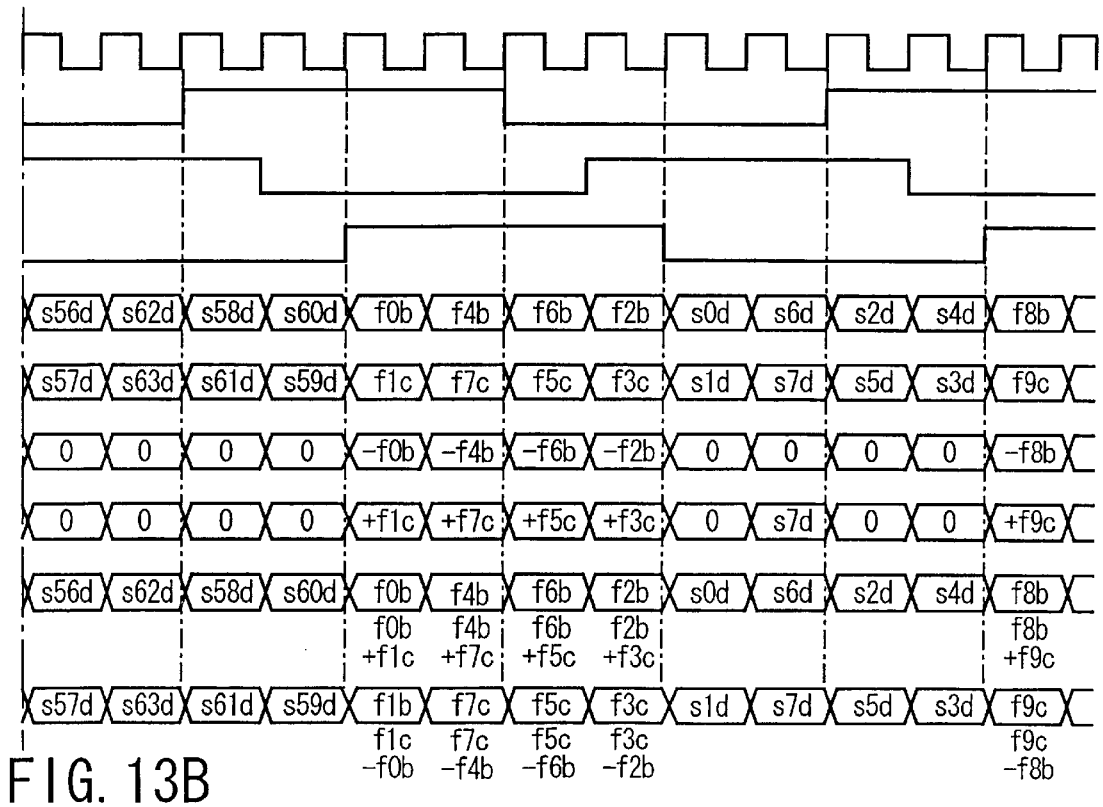

For the IDCT processing in the IDCT addition/subtraction processor 23, the IDCT intermediate signals z(0), z(1), ..., z(7) are generated, by the operation shown in Table 22, real signals (of pixel data) x(0), x(1), ..., x(7) which are the transformation results and are then output in the sequence shown in Table 24. For the DCT processing, one of the inputs of the adder is controlled to zero, the input data f(0), f(1), ..., f(7) are directly output in the sequence shown in Table 23. FIGS. 13A and 13B illustrate the timing of operation in the IDCT addition/subtraction processor 23.

Figure 14:
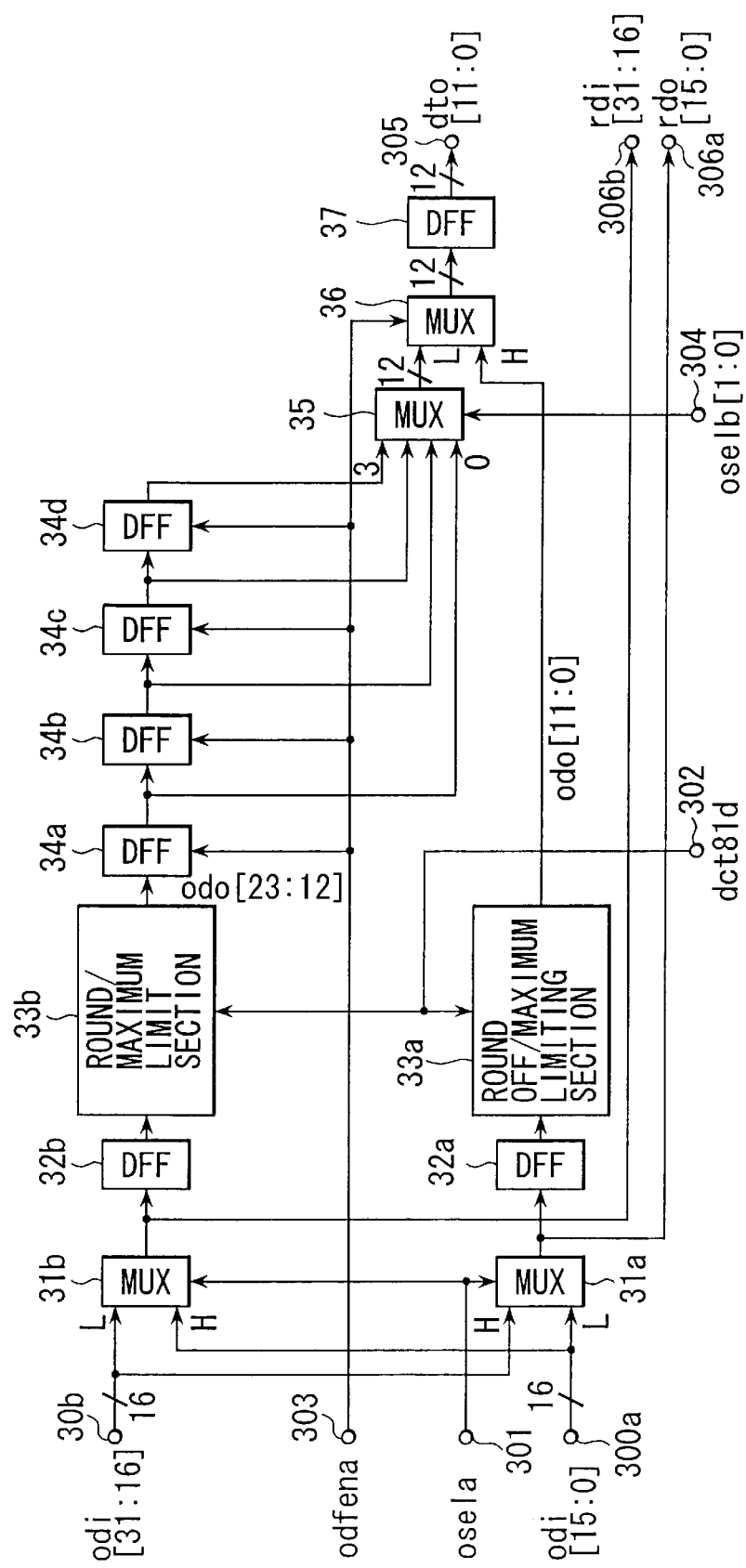
FIG. 14 is a block diagram showing a circuit arrangement of an output processor 3 in the embodiment of the present invention.
Figure 16A:
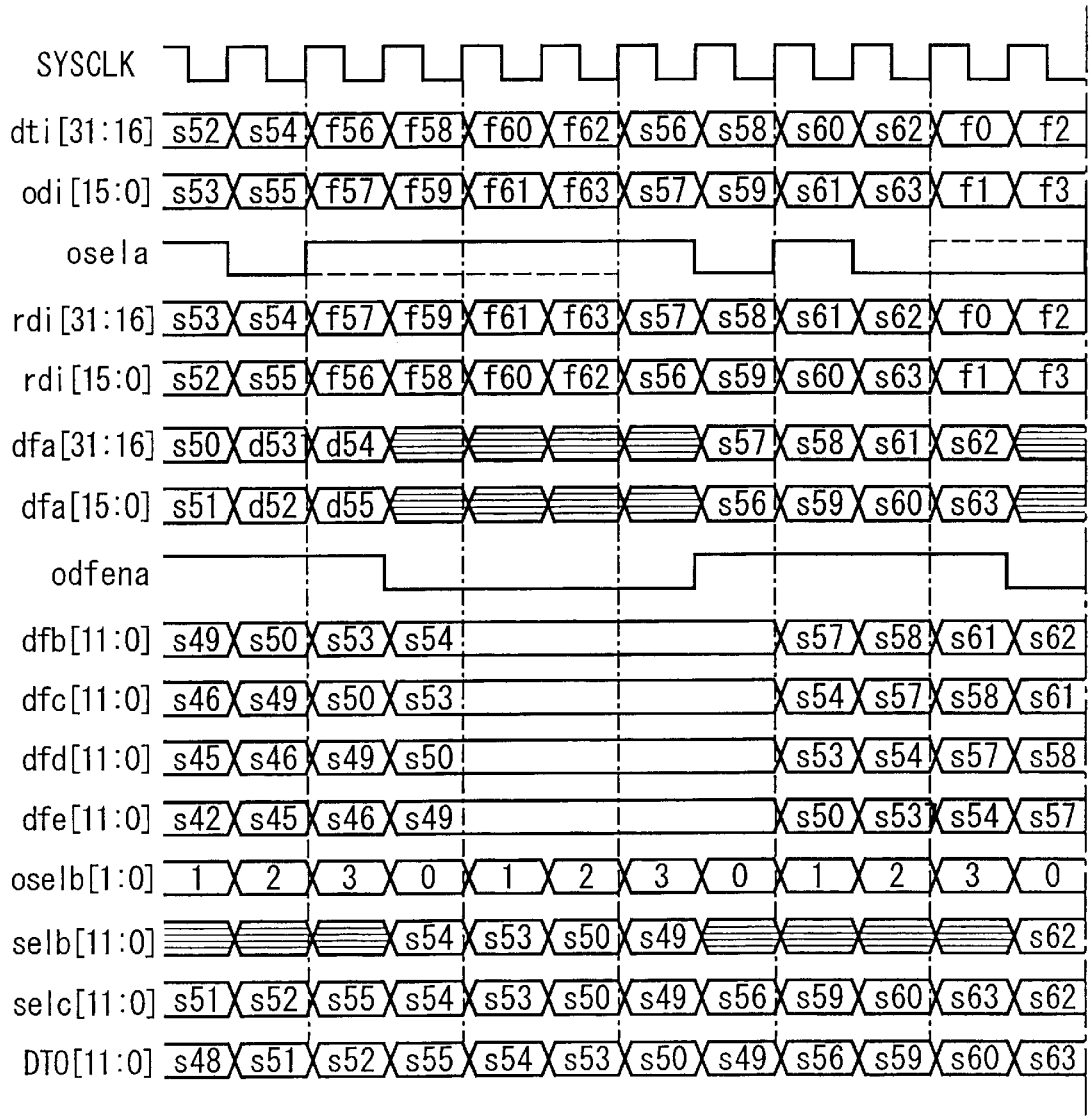
FIGS. 16A and 16B are diagrams schematically showing an action of the round-off/maximum limiting section 33a and 33b in the embodiment of the present invention.
Figure 16B:
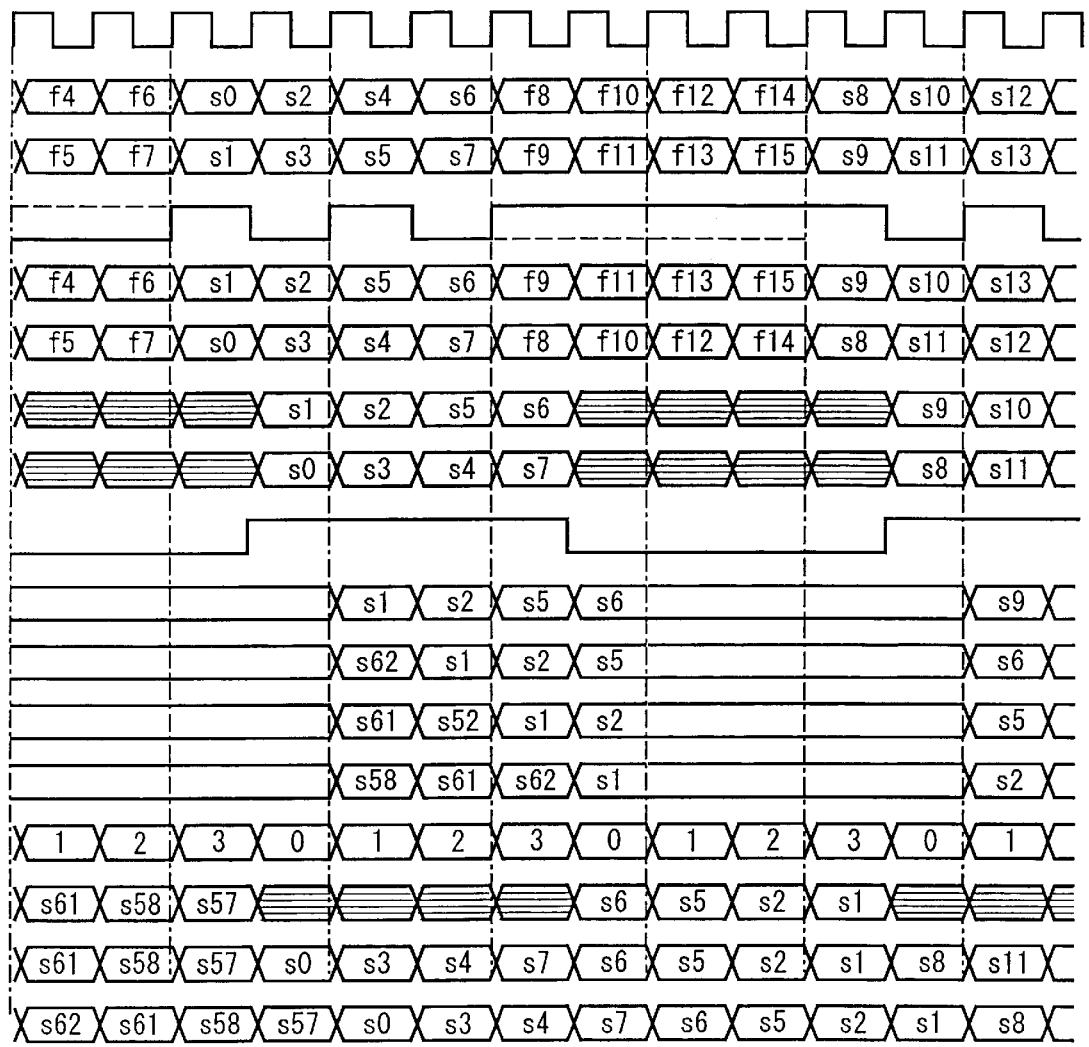

FIG. 14 is a block diagram showing an arrangement example of the output processor 3. FIGS. 16A and 16B illustrate the timing of operation in the output processor 3.

As shown in FIG. 14, selectors 31a and 31b perform interchange of the data over four clock periods of the one-dimensional processing of data input from the input terminals 300a and 300b by two units of data per clock period to output the interchanged data as rdi[15:0] and rdi[31:16] to output terminal 306a and 306b. They also perform interchange of the data over another four clock periods of the two-dimensional transformation processing to output the interchanged data to registers 32a and 32b.

The round-off/maximum limiting sections 33a and 33b perform the positive and negative symmetric rounding off and the maximum limiting for the two-dimensional processing result input every clock period via the registers 32a and 32b. Resultant data are output as odo[11:0] and odo[23:12].

Figure 15:
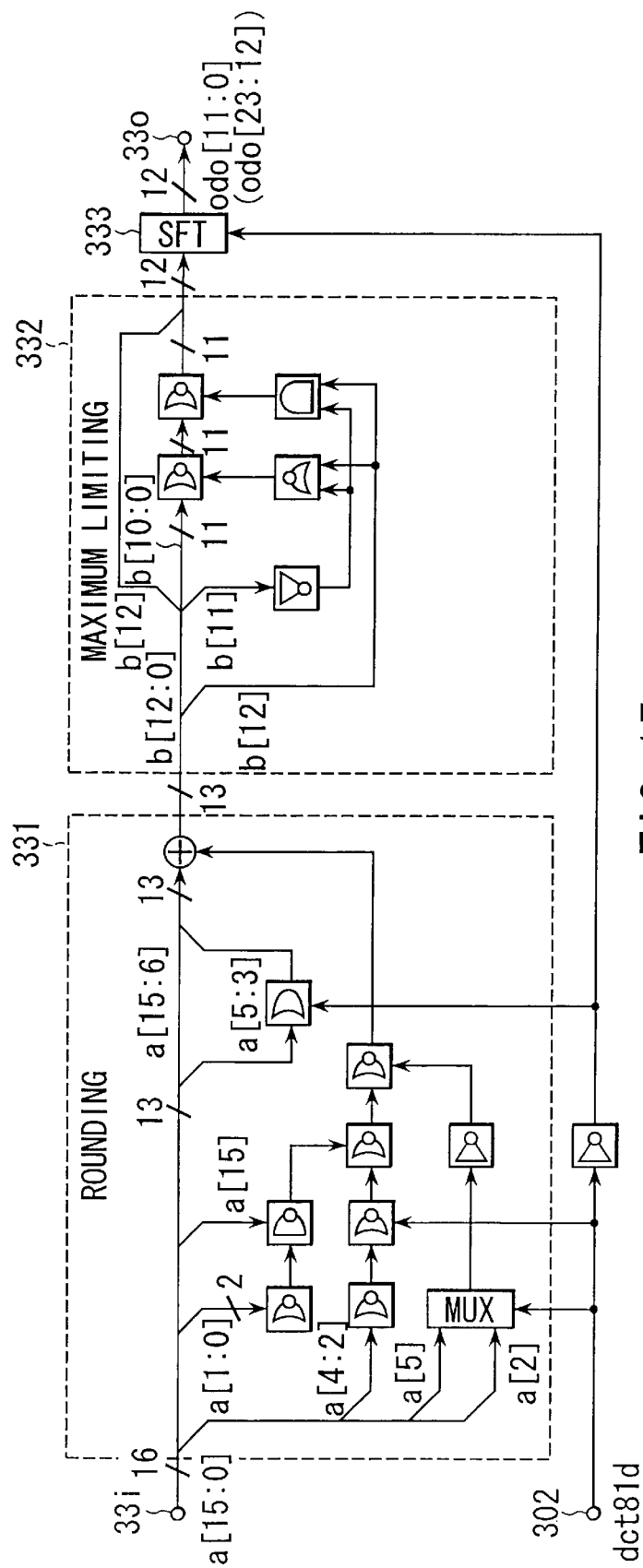
FIG. 15 is a diagram showing a circuit arrangement of a round-off/maximum limiting section 33a or 33b in the embodiment of the present invention.

FIG. 15 illustrates a circuit example of the round-off/maximum limiting section 33a or 33b. A round processor 331 is responsive to a control signal (dct81d) input from an input terminal 302 for rounding the lower three bits of the data input in the complement of two from an input terminal 33i for the DCT processing, and for rounding the lower six bits of the data for the IDCT processing, thus outputting the upper 13 bits as b[12:0]. More specifically, the adder for rounding is a common device over the upper bits between the DCT processing and the IDCT processing, effectively utilizes the operation bit number. In the DCT processing, the output is an integer of 13 bits. In the IDCT processing, the lower three bits (b[2:0]) is output as invalid data in the decimal place. A maximum limiting section 332, when the data b[12:0] input from the round processor 331 is a negative value smaller than 1800h in the hexadecimal notation, outputs a 12-bit data as 800*h*. When the data b is a positive value greater than 07ffh, the section 332 outputs the 12-bit data as 7ffh. Because the output of the round processor 331 is an upper portion of the bits, the maximum limiting section 332 perform the same operation for both the DCT processing and the IDCT processing. A bit shift processor 333 is responsive to a control signal (dct81*d*) input from the input terminal 302 for outputting the data output from the maximum limiting section 332 directly for the DCT processing, and for shifting the data output of the maximum limiting section 332 by three bits to the right (the upper three bits being code expanded) for the IDCT processing, from the output terminal 33*o*.

A group of registers 34*a*, 34*b*, 34*c*, and 34*d* are responsive to a control signal (odfena) input from an input terminal 303 for receiving output from the round-off/maximum limiting section 33*b* and updating each register output in every clock period and saving the data for five clock periods (as denoted by dfb, dfc, dfd, and dfde in FIGS. 16A and 16B). A selector 35 (selb) is a selector (selb shown in FIGS. 16A and 16B) for outputting the data saved in the registers 34*a*, 34*b*, 34*c*, and 34*d* in an inverse of the input sequence (as denoted by selb in FIGS. 16A and 16B) through the control signal input from the input terminal 304.

the output of the selector 35 in every four clock periods to process eight data input by two units of data per clock period via the registers 32*a* and 32*b* for the succeeding four clock periods and outputting them by one data per clock period for eight clock periods via an output register 37 from an output terminal 305 (as selc[11:0] shown in FIGS. 16A and 16B).

Because the rounding off and the maximum limiting are carried out prior to smoothing of the output (one data per clock), the number of bits of registers can be reduced as compared with conducting the rounding off and the maximum limiting after the smoothing operation, hence minimizing the overall circuit arrangement.

Figure 17:
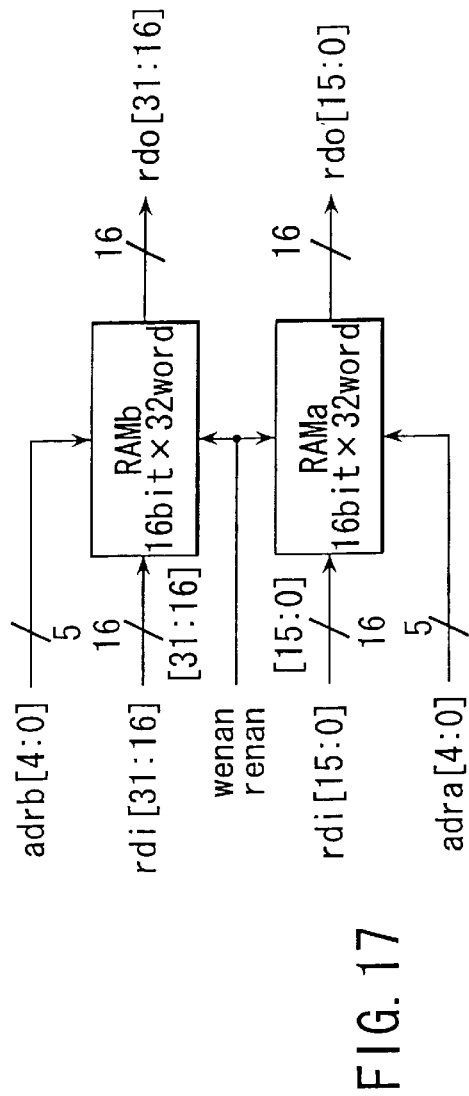
FIG. 17 is a diagram showing a circuit arrangement of a transposition processor 4 in the embodiment.
Figure 18:
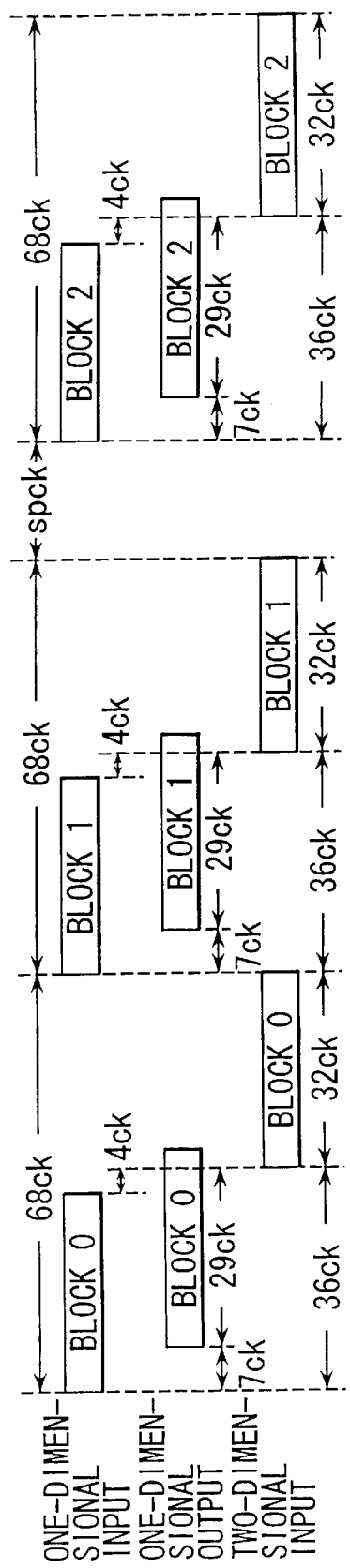
FIG. 18 is a diagram showing a first processing timing in the prior art.
Figure 19:
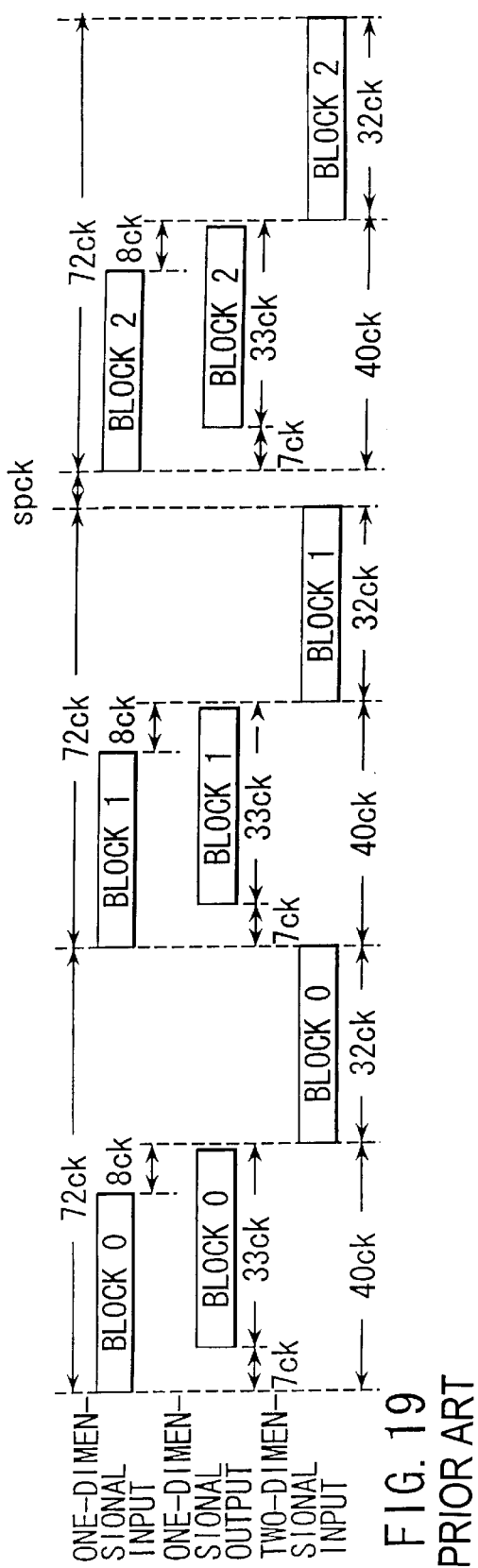
FIG. 19 is a diagram showing a second processing timing in the prior art.
Figure 20:
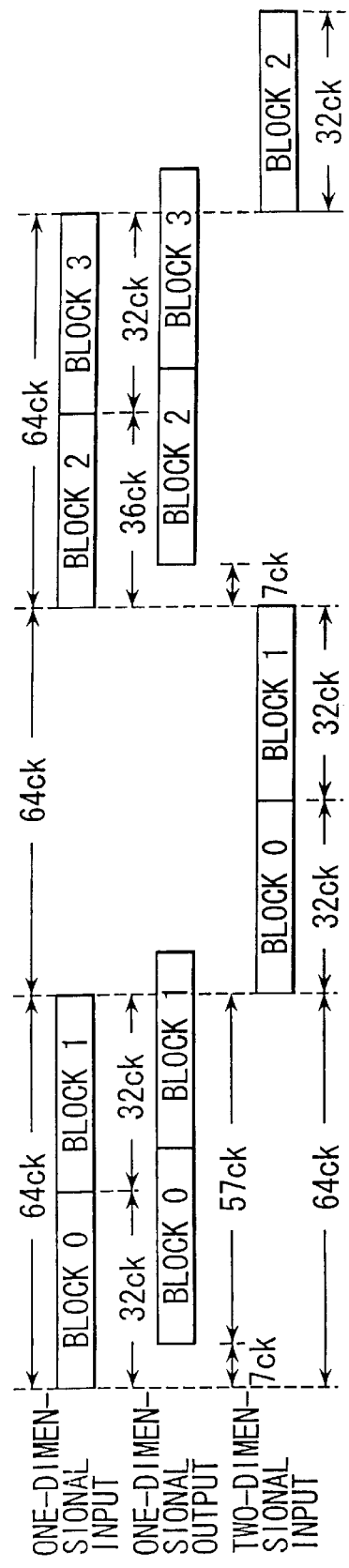
FIG. 20 is a diagram showing a third processing timing in the prior art.

FIG. 17 is a block diagram showing an arrangement of the transposition processor 4. The data input by two units of data per clock period is read out every two units of data, two RAMs of 16 bits by 32 words are employed so that two RAM address controls (adra[4:0] and adrb[4:0]) are different from each other. However, since the write and the read are executed simultaneously, and the write and the read are switched from one to the other in every four clock periods,

TABLE 25

| odi[31:16] | f(0) | f(6) | f(2) | f(4) | | | | | | |
|---|---|---|---|---|---|---|---|---|---|---|
| odi[15:0] | f(7) | f(1) | f(5) | f(3) | | | | | | |
| DTO[11:0] | | | f(0) | f(1) | f(2) | f(3) | f(4) | f(5) | f(6) | f(7) |

TABLE 26

| odi[31:16] | x(0) | x(6) | x(2) | x(4) | | | | | | |
|---|---|---|---|---|---|---|---|---|---|---|
| odi[15:0] | x(7) | x(1) | x(5) | x(3) | | | | | | |
| DTO[11:0] | | | x(0) | x(1) | x(2) | x(3) | x(4) | x(5) | x(6) | x(7) |

A selector 36 is responsive to a control signal (odfena) input from the input terminal 303 for switching between the output of the round-off/maximum limiting section 33*a* and both the RAMs are of a one-port type and the write control signal wenan and the read control signal renan for the RAMs are common.

TABLE 27

| Address | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| rdi[31:16] | (0,0) | (0,6) | (0,2) | (0,4) | (1,7) | (1,1) | (1,5) | (1,3) | (2,0) | (2,6) | (2,2) | (2,4) | (3,7) | (3,1) | (3,5) | (3,3) |
| Address | 0 | 1 | 2 | 3 | 4 | 5 | 6 | 7 | 8 | 9 | 10 | 11 | 12 | 13 | 14 | 15 |
| rdi[15:0] | (0,7) | (0,1) | (0,5) | (0,3) | (1,0) | (1,6) | (1,2) | (1,4) | (2,7) | (2,1) | (2,5) | (2,3) | (3,0) | (3,6) | (3,2) | (3,4) |
| Address | 16 | 17 | 18 | 19 | 20 | 21 | 22 | 23 | 24 | 25 | 26 | 27 | 28 | 29 | 30 | 31 |
| rdi[31:16] | (4,0) | (4,6) | (4,2) | (4,4) | (5,7) | (5,1) | (5,5) | (5,3) | (6,0) | (6,6) | (6,2) | (6,4) | (7,7) | (7,1) | (7,5) | (7,3) |
| Address | 16 | 17 | 18 | 19 | 20 | 21 | 22 | 23 | 24 | 25 | 26 | 27 | 28 | 29 | 30 | 31 |
| rdi[15:0] | (4,7) | (4,1) | (4,5) | (4,3) | (5,0) | (5,6) | (5,2) | (5,4) | (6,7) | (6,1) | (6,5) | (6,3) | (7,0) | (7,6) | (7,2) | (7,4) |

TABLE 28

| Address | 0 | 24 | 8 | 16 | 29 | 5 | 21 | 13 | 2 | 26 | 10 | 18 | 31 | 7 | 23 | 15 |
|---|---|---|---|---|---|---|---|---|---|---|---|---|---|---|---|---|
| rdi[31:16] | (0,0) | (0,6) | (0,2) | (0,4) | (1,7) | (1,1) | (1,5) | (1,3) | (2,0) | (2,6) | (2,2) | (2,4) | (3,7) | (3,1) | (3,5) | (3,3) |
| Address | 28 | 4 | 20 | 12 | 1 | 25 | 9 | 17 | 30 | 6 | 22 | 14 | 3 | 27 | 11 | 19 |
| rdi[15:0] | (0,7) | (0,1) | (0,5) | (0,3) | (1,0) | (1,6) | (1,2) | (1,4) | (2,7) | (2,1) | (2,5) | (2,3) | (3,0) | (3,6) | (3,2) | (3,4) |
| Address | 3 | 27 | 11 | 19 | 30 | 6 | 22 | 14 | 1 | 25 | 9 | 17 | 28 | 4 | 20 | 12 |
| rdi[31:16] | (4,0) | (4,6) | (4,2) | (4,4) | (5,7) | (5,1) | (5,5) | (5,3) | (6,0) | (6,6) | (6,2) | (6,4) | (7,7) | (7,1) | (7,5) | (7,3) |
| Address | 31 | 7 | 23 | 15 | 2 | 26 | 10 | 18 | 29 | 5 | 21 | 13 | 0 | 24 | 8 | 16 |
| rdi[15:0] | (4,7) | (4,1) | (4,5) | (4,3) | (5,0) | (5,6) | (5,2) | (5,4) | (6,7) | (6,1) | (6,5) | (6,3) | (7,0) | (7,6) | (7,2) | (7,4) |

TABLE 29

| Address | 16 | 8 | 24 | 0 | 13 | 21 | 5 | 29 | 18 | 10 | 26 | 2 | 15 | 23 | 7 | 31 |
|---|---|---|---|---|---|---|---|---|---|---|---|---|---|---|---|---|
| rdo[31:16] | (4,0) | (2,0) | (6,0) | (0,0) | (3,1) | (5,1) | (1,1) | (7,1) | (4,2) | (2,2) | (6,2) | (0,2) | (3,3) | (5,3) | (1,3) | (7,3) |
| Address | 12 | 20 | 4 | 28 | 17 | 9 | 25 | 1 | 14 | 22 | 6 | 30 | 19 | 11 | 27 | 3 |
| rdo[15:0] | (3,0) | (5,0) | (1,0) | (7,0) | (4,1) | (2,1) | (6,1) | (0,1) | (3,2) | (5,2) | (1,2) | (7,2) | (4,3) | (2,3) | (6,3) | (0,3) |
| Address | 19 | 11 | 27 | 3 | 14 | 22 | 6 | 30 | 17 | 9 | 25 | 1 | 12 | 20 | 4 | 28 |
| rdo[31:16] | (4,4) | (2,4) | (6,4) | (0,4) | (3,5) | (5,5) | (1,5) | (7,5) | (4,6) | (2,6) | (6,6) | (0,6) | (3,7) | (5,7) | (1,7) | (7,7) |
| Address | 15 | 23 | 7 | 31 | 18 | 10 | 26 | 2 | 13 | 21 | 5 | 29 | 16 | 8 | 24 | 0 |
| rdo[15:0] | (3,4) | (5,4) | (1,4) | (7,4) | (4,5) | (2,5) | (6,5) | (0,5) | (3,6) | (5,6) | (1,6) | (7,6) | (4,7) | (2,7) | (6,7) | (0,7) |

TABLE 30

| Address | 3 | 2 | 1 | 0 | 7 | 6 | 5 | 4 | 11 | 10 | 9 | 8 | 15 | 14 | 13 | 12 |
|---|---|---|---|---|---|---|---|---|---|---|---|---|---|---|---|---|
| rdo[31:16] | (4,0) | (2,0) | (6,0) | (0,0) | (3,1) | (5,1) | (1,1) | (7,1) | (4,2) | (2,2) | (6,2) | (0,2) | (3,3) | (5,3) | (1,3) | (7,3) |
| Address | 3 | 2 | 1 | 0 | 7 | 6 | 5 | 4 | 11 | 10 | 9 | 8 | 16 | 14 | 13 | 12 |
| rdo[15:0] | (3,0) | (5,0) | (1,0) | (7,0) | (4,1) | (2,1) | (6,1) | (0,1) | (3,2) | (5,2) | (1,2) | (7,2) | (4,3) | (2,3) | (6,3) | (0,3) |
| Address | 19 | 18 | 17 | 16 | 23 | 22 | 21 | 20 | 27 | 26 | 25 | 24 | 31 | 30 | 29 | 28 |
| rdo[31:16] | (4,4) | (2,4) | (6,4) | (0,4) | (3,5) | (5,6) | (1,5) | (7,5) | (4,6) | (2,6) | (6,6) | (0,6) | (3,7) | (5,7) | (1,7) | (7,7) |
| Address | 19 | 18 | 17 | 16 | 23 | 22 | 21 | 20 | 27 | 26 | 25 | 24 | 31 | 30 | 29 | 28 |
| rdo[15:0] | (3,4) | (5,4) | (1,4) | (7,4) | (4,5) | (2,5) | (6,5) | (0,5) | (3,6) | (5,6) | (1,6) | (7,6) | (4,7) | (2,7) | (6,7) | (0,7) |

TABLE 31

| | Write | | | | Read | | | |
|---|---|---|---|---|---|---|---|---|
| | Even phase | | Odd phase | | Even phase | | Odd phase | |
| | adrb [4:0] | adra [4:0] | adrb [4:0] | adra [4:0] | adrb [4:0] | adra [4:0] | adrb [4:0] | adra [4:0] |
| 0 | 00_0_00 | 00_0_00 | 00_0_00 | 11_1_00 | 10_0_00 | 01_1_00 | 00_0_11 | 00_0_11 |
| 1 | 00_0_01 | 00_0_01 | 11_0_00 | 00_1_00 | 01_0_00 | 10_1_00 | 00_0_10 | 00_0_10 |
| 2 | 00_0_10 | 00_0_10 | 01_0_00 | 10_1_00 | 11_0_00 | 00_1_00 | 00_0_01 | 00_0_01 |
| 3 | 00_0_11 | 00_0_11 | 10_0_00 | 01_1_00 | 00_0_00 | 11_1_00 | 00_0_00 | 00_0_00 |
| 4 | 00_1_00 | 00_1_00 | 11_1_01 | 00_0_01 | 01_1_01 | 10_0_01 | 00_1_11 | 00_1_11 |
| 5 | 00_1_01 | 00_1_01 | 00_1_01 | 11_0_01 | 10_1_01 | 01_0_01 | 00_1_10 | 00_1_10 |
| 6 | 00_1_10 | 00_1_10 | 10_1_01 | 01_0_01 | 00_1_01 | 11_0_01 | 00_1_01 | 00_1_01 |
| 7 | 00_1_11 | 00_1_11 | 01_1_01 | 10_0_01 | 11_1_01 | 00_0_01 | 00_1_00 | 00_1_00 |
| 8 | 01_0_00 | 01_0_00 | 00_0_10 | 11_1_10 | 10_0_10 | 01_1_10 | 01_0_11 | 01_0_11 |
| 9 | 01_0_01 | 01_0_01 | 11_0_10 | 00_1_10 | 01_0_10 | 10_1_10 | 01_0_10 | 01_0_10 |
| 10 | 01_0_10 | 01_0_10 | 01_0_10 | 10_1_10 | 11_0_10 | 00_1_10 | 01_0_01 | 01_0_01 |
| 11 | 01_0_11 | 01_0_11 | 10_0_10 | 01_1_10 | 00_0_10 | 11_1_10 | 01_0_00 | 01_0_00 |
| 12 | 01_1_00 | 01_1_00 | 11_1_11 | 00_0_11 | 01_1_11 | 10_0_11 | 01_1_11 | 01_1_11 |
| 13 | 01_1_01 | 01_1_01 | 00_1_11 | 11_0_11 | 10_1_11 | 01_0_11 | 01_1_10 | 01_1_10 |
| 14 | 01_1_10 | 01_1_10 | 10_1_11 | 01_0_11 | 00_1_11 | 11_0_11 | 01_1_01 | 01_1_01 |
| 15 | 01_1_11 | 01_1_11 | 01_1_11 | 10_0_11 | 11_1_11 | 00_0_11 | 01_1_00 | 01_1_00 |
| 16 | 10_0_00 | 10_0_00 | 00_0_11 | 11_1_11 | 10_0_11 | 01_1_11 | 10_0_11 | 10_0_11 |
| 17 | 10_0_01 | 10_0_01 | 11_0_11 | 00_1_11 | 01_0_11 | 10_1_11 | 10_0_10 | 10_0_10 |
| 18 | 10_0_10 | 10_0_10 | 01_0_11 | 10_1_11 | 11_0_11 | 00_1_11 | 10_0_01 | 10_0_01 |
| 19 | 10_0_11 | 10_0_11 | 10_0_11 | 01_1_11 | 00_0_11 | 11_1_11 | 10_0_00 | 10_0_00 |
| 20 | 10_1_00 | 10_1_00 | 11_1_10 | 00_0_10 | 01_1_10 | 10_0_10 | 10_1_11 | 10_1_11 |
| 21 | 10_1_01 | 10_1_01 | 00_1_10 | 11_0_10 | 10_1_10 | 01_0_10 | 10_1_10 | 10_1_10 |
| 22 | 10_1_10 | 10_1_10 | 10_1_10 | 01_0_10 | 00_1_10 | 11_0_10 | 10_1_01 | 10_1_01 |
| 23 | 10_1_11 | 10_1_11 | 01_1_10 | 10_0_10 | 11_1_10 | 00_0_10 | 10_1_00 | 10_1_00 |
| 24 | 11_0_00 | 11_0_00 | 00_0_01 | 11_1_01 | 10_0_01 | 01_1_01 | 11_0_11 | 11_0_11 |
| 25 | 11_0_01 | 11_0_01 | 11_0_01 | 00_1_01 | 01_0_01 | 10_1_01 | 11_0_10 | 11_0_10 |
| 26 | 11_0_10 | 11_0_10 | 01_0_01 | 10_1_01 | 11_0_01 | 00_1_01 | 11_0_01 | 11_0_01 |
| 27 | 11_0_11 | 11_0_11 | 10_0_01 | 01_1_01 | 00_0_01 | 11_1_01 | 11_0_00 | 11_0_00 |
| 28 | 11_1_00 | 11_1_00 | 11_1_00 | 00_0_00 | 01_1_00 | 10_0_00 | 11_1_11 | 11_1_11 |
| 29 | 11_1_01 | 11_1_01 | 00_1_00 | 11_0_00 | 10_1_00 | 01_0_00 | 11_1_10 | 11_1_10 |
| 30 | 11_1_10 | 11_1_10 | 10_1_00 | 01_0_00 | 00_1_00 | 11_0_00 | 11_1_01 | 11_1_01 |
| 31 | 11_1_11 | 11_1_11 | 01_1_00 | 10_0_00 | 11_1_00 | 00_0_00 | 11_1_00 | 11_1_00 |

The address order for writing the data (rdi[31:0]) input from the output processor 3 into the transposition RAM is the same as in the DCT processing and the IDCT processing, the address orders shown in Tables 27 and 28 are used alternately every block. Also, the address order for reading the data from the transposition RAM is the sane as in the DCT processing and the IDCT processing, the address orders shown in Tables 29 and 30 are used alternately every block. The address control patterns are shown in Table 31.

As set forth above, the present invention permits not only the operating circuit to be reduced to substantially a half in the size but also the timing of writing and reading on the transposition memory to be exclusively made over one block area of the transposition RAM size thereby the transposition RAM area to a half. For smoothing the input and output, the registers of 4-word type can be used thus minimizing the overall circuit dimensions. When the single eight-point transformation processor carries out the operation at two pixel per clock period, the distance between block data inputs can be determined over one block in every eight clock periods or over two or more blocks in every one clock period, hence minimizing declination of the operational efficiency.

Although there has been explained that the eight-point orthogonal transformation processor 2 inputs and outputs two units of data in every one clock period, it may equally handle four data per clock period with the one-dimensional processing and the two-dimensional processing switched from one to the other in every two clock periods.

Additional advantages and modifications will readily occur to those skilled in the art. Therefore, the prevent invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A discrete cosine transformation/inverse discrete cosine transformation apparatus comprising:

a single N-point transformation processor which switches in every N points between a one-dimensional processing and a two-dimensional processing to perform orthogonal transformation of N×N points;

wherein the N-point transformation processor incorporates a single eight-pixel transformation processor which switches in every eight pixels between one-dimensional processing and two-dimensional processing to perform orthogonal transformation of 8×8 pixels; and an input processor which comprises an input register configured to fetch in every clock period the data input from a first input terminal, a selector which is responsive to a control signal input from a second terminal and shifts an output of the input register three bits to the left for the discrete cosine transformation because the lower nine bits of the input data are valid and for directly outputting the output of the register without carrying out any bits shifting for the inverse discrete cosine transformation, a plurality of stage registers which are responsive to a control signal input from a third input terminal, update the data in every clock periods and saves it for five clock periods, a selector which is responsive to a control signal input from a fourth input terminal and outputs the data saved in the registers in an reverse of the input sequence, a selector which is responsive to a control signal input from the third input terminal, selects an output of the shifter and an output of the selector in every four clock periods, and outputs at a rate of two units of data per clock period eight units of data input at a rate of one data per clock period from the first input terminal for four clock periods and at the rate of two units of data per clock period transposed data input from the fourth input terminal for the succeeding four clock periods, and a selector which is responsive to a control signal input from a fifth input terminal and interchanges the data so that its sequence is suited for the arithmetic operation in the eight-pixel transformation processor.

2. A discrete cosine transformation/inverse discrete cosine transformation apparatus comprising:

a single N-point transformation processor which switches in every N points between a one-dimensional processing and a two-dimensional processing to perform orthogonal transformation of N×N points;

wherein the N-point transformation processor incorporates a single eight-pixel transformation processor which switches in every eight pixels between one-dimensional processing and two-dimensional processing to perform orthogonal transformation of 8×8 pixels; and an output processor which comprises a first selector configured to interchange the data input at the rate of two units of data per clock period from a first input terminal, of four clock periods for the one-dimensional processing to initialize prior to the transposition and interchange the data of four clock periods for the two-dimensional processing to adjust its output sequence, a first register which receives via the first selector the data of the four clock period in the two-dimensional processing, a round-off/maximum limiting section which rounds in equally both positive and negative directions and maximum limits the two-dimensional processing result input in every clock period from the register, a second register which is responsive to a control signal input from a second input terminal, updates in every clock period a register output of the round-off/maximum limiting section and saves the data of five clock periods, a second selector which is responsive to a control signal input from a third input terminal and outputs the data saved in the second register in a reverse of the input sequence, a third selector which is responsive to a control signal input from the first input terminal and switches in every four block periods between an output of the round-off/maximum limiting section and an output of the second selector, and an output register which receives eight units of data at the rate of two units of data per clock period for four clock periods from the first register and outputs them at a rate of one data per clock period for eight clock periods.

* * * * *

UNITED STATES PATENT AND TRADEMARK OFFICE
CERTIFICATE OF CORRECTION

PATENT NO. : 6,732,131 B1
DATED : May 4, 2004
INVENTOR(S) : Uetani

It is certified that error appears in the above-identified patent and that said Letters Patent is hereby corrected as shown below:

<u>Title page,</u>
Item [73], Assignee, should read
-- [73] Assigneee: Kabushiki Kaisha Toshiba, Kawasaki (JP) --

Signed and Sealed this

Sixth Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,732,131 B1
DATED : May 4, 2004
INVENTOR(S) : Uetani

It is certified that error appears in the above-identified patent and that said Letters Patent is hereby corrected as shown below:

<u>Title page,</u>
Item [73], Assignee, should read
-- [73] Assigneee: Kabushiki Kaisha Toshiba, Kawasaki (JP) --

This certificate supersedes Certificate of Correction issued July 6, 2004.

Signed and Sealed this

Thirty-first Day of August, 2004

JON W. DUDAS
*Director of the United States Patent and Trademark Office*

UNITED STATES PATENT AND TRADEMARK OFFICE
CERTIFICATE OF CORRECTION

PATENT NO.    : 6,732,131 B1
DATED         : May 4, 2004
INVENTOR(S)   : Uetani

It is certified that error appears in the above-identified patent and that said Letters Patent is hereby corrected as shown below:

<u>Title page,</u>
Item [73], Assignee, should read
-- [73] Assignee: Kabushiki Kaisha Toshiba, Kawasaki (JP) --

This certificate supersedes Certificate of Correction issued August 31, 2004.

Signed and Sealed this

Twenty-sixth Day of October, 2004

JON W. DUDAS
*Director of the United States Patent and Trademark Office*